United States Patent
Koren et al.

(10) Patent No.: US 9,665,442 B2
(45) Date of Patent: May 30, 2017

(54) SMART FLUSHING OF DATA TO BACKUP STORAGE

(75) Inventors: Benny Koren, Zikhron Ya'aqov (IL); Erez Zilber, Zichron Yuakov (IL); Avi Kaplan, Kiryat-Ata (IL); Shachar Fienblit, Ein Ayala (IL); Guy Keren, Haifa (IL); Eyal Gordon, Haifa (IL)

(73) Assignee: KAMINARIO TECHNOLOGIES LTD., Yokne'am Ilit (IL)

( * ) Notice: Subject to any disclaimer, the term of this patent is extended or adjusted under 35 U.S.C. 154(b) by 1537 days.

(21) Appl. No.: 13/074,455

(22) Filed: Mar. 29, 2011

(65) Prior Publication Data
US 2011/0252201 A1    Oct. 13, 2011

Related U.S. Application Data

(60) Provisional application No. 61/318,477, filed on Mar. 29, 2010.

(51) Int. Cl.
   *G06F 12/00*           (2006.01)
   *G06F 11/14*           (2006.01)
   (Continued)

(52) U.S. Cl.
   CPC ........ *G06F 11/1456* (2013.01); *G06F 3/0608* (2013.01); *G06F 3/0649* (2013.01);
   (Continued)

(58) Field of Classification Search
None
See application file for complete search history.

(56) References Cited

U.S. PATENT DOCUMENTS 5,130,992 A * 7/1992 Frey et al. .................... 714/766
5,742,792 A * 4/1998 Yanai et al. .................. 711/162
(Continued)

FOREIGN PATENT DOCUMENTS

WO    WO 2010/049929 A1    5/2010

OTHER PUBLICATIONS

Nelson et.al. "Caching in the Sprite Network File System" ACM vol. 6, No. 1 Feb. 1988.*

*Primary Examiner* — Yong Choe
*Assistant Examiner* — Tasnima Matin
(74) *Attorney, Agent, or Firm* — Wiggin and Dana LLP; Gregory S. Rosenblatt; Jonathan D. Hall

(57) ABSTRACT

A storage system, including: (a) a primary storage entity utilized for storing a data-set of the storage system; (b) a secondary storage entity utilized for backing-up the data within the primary storage entity; (c) a flushing management module adapted to identify within the primary storage entity two groups of dirty data blocks, each group is comprised of dirty data blocks which are arranged within the secondary storage entity in a successive sequence, and to further identify within the primary storage entity a further group of backed-up data blocks which are arranged within the secondary storage entity in a successive sequence intermediately in-between the two identified groups of dirty data blocks; and (d) said flushing management module is adapted to combine the group of backed-up data blocks together with the two identified groups of dirty data blocks to form a successive extended flush sequence and to destage it to the secondary storage entity.

46 Claims, 6 Drawing Sheets

(51) Int. Cl.
*G06F 3/06* (2006.01)
*G06F 12/0804* (2016.01)

(52) U.S. Cl.
CPC ........ *G06F 3/0685* (2013.01); *G06F 11/1448* (2013.01); *G06F 12/0804* (2013.01)

(56) References Cited

U.S. PATENT DOCUMENTS

| | | | |
|---|---|---|---|
| 5,889,935 A * | 3/1999 | Ofek et al. | 714/6.23 |
| 6,912,669 B2 * | 6/2005 | Hauck et al. | 714/6.23 |
| 7,085,895 B2 * | 8/2006 | Kishi | 711/135 |
| 7,418,547 B2 * | 8/2008 | Lam | 711/113 |
| 7,606,841 B1 * | 10/2009 | Ranade | 707/615 |
| 7,680,843 B1 * | 3/2010 | Panchbudhe et al. | 707/999.204 |
| 2002/0048284 A1 * | 4/2002 | Moulton et al. | 370/500 |
| 2004/0268068 A1 * | 12/2004 | Curran et al. | 711/162 |
| 2005/0146945 A1 * | 7/2005 | Cannon | 365/189.05 |
| 2005/0216788 A1 * | 9/2005 | Mani-Meitav et al. | 714/6 |
| 2008/0259764 A1 | 10/2008 | Bates et al. | |
| 2008/0259765 A1 | 10/2008 | Bates et al. | |
| 2009/0100230 A1 * | 4/2009 | Lam | 711/135 |

* cited by examiner

SMART FLUSHING OF DATA TO BACKUP STORAGE

RELATED APPLICATION

This application claims priority from U.S. provisional patent application Ser. No. 61/318,477 filed Mar. 29, 2010, which is incorporated herein in its entirety by reference.

FIELD OF THE INVENTION

The present invention is in the field of multi-tiered storage systems.

SUMMARY OF THE INVENTION

The present invention relates to a storage system and to a method of managing a storage system.

In some embodiments, there is provided a storage system, comprising: a primary storage entity, a secondary storage entity and a flushing management module. The primary storage entity is utilized for storing a data-set of the storage system. The secondary storage entity is utilized for backing-up the data within the primary storage entity. The flushing management module is adapted to identify within the primary storage entity two groups of dirty data blocks, each group is comprised of dirty data blocks which are arranged within the secondary storage entity in a successive sequence, and to further identify within the primary storage entity a further group of backed-up data blocks which are arranged within the secondary storage entity in a successive sequence intermediately in-between the two identified groups of dirty data blocks. The flushing management module is adapted to combine the group of backed-up data blocks together with the two identified groups of dirty data blocks to form a successive extended flush sequence and to destage it to the secondary storage entity.

According to a further aspect of the invention, there is provided a method of managing a storage system. The method of managing a storage system according to some embodiments of the present invention may include: identifying within a primary storage entity two groups of dirty data blocks, each group is comprised of dirty data blocks which are arranged within a secondary storage entity in a successive sequence, and to further identify within the primary storage entity a further group of backed-up data blocks which are arranged within the secondary storage entity in a successive sequence intermediately in-between the two identified groups of dirty data blocks; and combining the group of backed-up data blocks together with the two identified groups of dirty data blocks to form a successive extended flush sequence and to destage it to the secondary storage entity.

According to yet a further aspect of the invention, there is provided a program storage device readable by machine, tangibly embodying a program of instructions executable by the machine to perform a method of managing a storage system including: identifying within a primary storage entity two groups of dirty data blocks, each group is comprised of dirty data blocks which are arranged within a secondary storage entity in a successive sequence, and to further identify within the primary storage entity a further group of backed-up data blocks which are arranged within the secondary storage entity in a successive sequence intermediately in-between the two identified groups of dirty data blocks; and combining the group of backed-up data blocks together with the two identified groups of dirty data blocks to form a successive extended flush sequence and to destage it to the secondary storage entity.

According to still a further aspect of the invention, there is provided a computer program product comprising a computer usable medium having computer readable program code embodied therein of managing a storage system, the computer program product comprising: computer readable program code for causing the computer to identify within a primary storage entity two groups of dirty data blocks, each group is comprised of dirty data blocks which are arranged within a secondary storage entity in a successive sequence, and to further identify within the primary storage entity a further group of backed-up data blocks which are arranged within the secondary storage entity in a successive sequence intermediately in-between the two identified groups of dirty data blocks; and computer readable program code for causing the computer to combine the group of backed-up data blocks together with the two identified groups of dirty data blocks to form a successive extended flush sequence and to destage it to the secondary storage entity.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
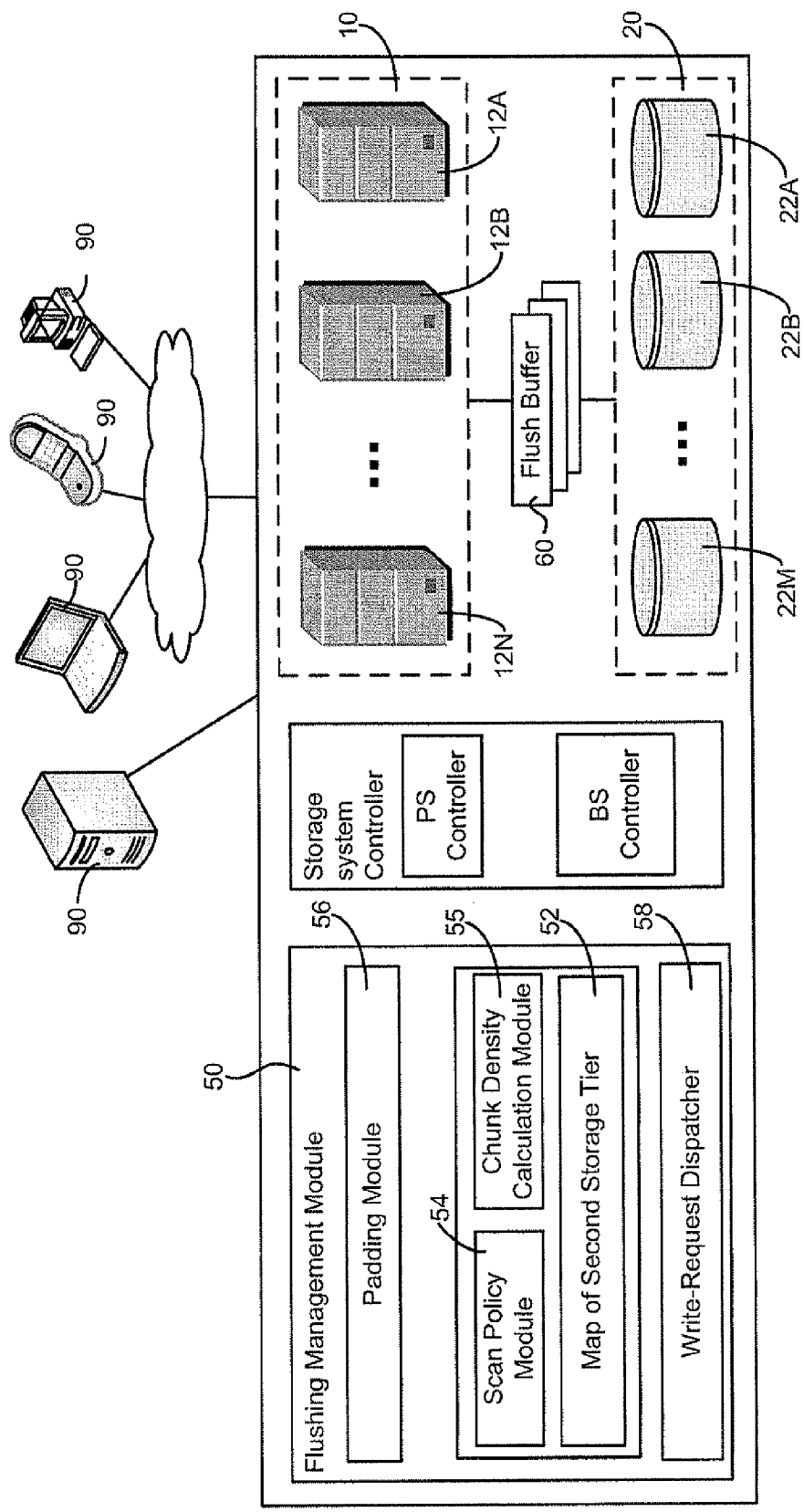
FIG. 1 is a block diagram illustration of a hierarchical storage system including a flushing module, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "mapping", "assigning", "allocating", "designating", "mapping", "overriding", "reinstating", "snapshot", "updating", "provisioning" or the like, refer to the action and/or processes of a computer that manipulate and/or transform data into other data, said data represented as physical, e.g. such as electronic, quantities stored within non-transitive medium. The term "computer" should be expansively construed to cover any kind of electronic device with non-transitive data recordation and data processing capabilities, including, by way of non-limiting example, personal computers, servers, computing system, communication devices, processors (e.g. digital signal processor (DSP), microcontrollers, field programmable gate array (FPGA), application specific integrated circuit (ASIC, etc.) and other electronic computing devices. Non-transitive storage or recordation of data as used herein includes storage of data within a volatile storage medium utilized in combination with Uninterruptible Power Supply ("UPS"), destaging logic, and backup non-volatile storage— to persistently store data thereon, as will be described in further detail below.

The operations in accordance with the teachings herein may be performed by a computer specially constructed for the desired purposes or by a general purpose computer specially configured for the desired purpose by a computer program non-transitively stored in a computer readable storage medium.

In addition, embodiments of the present invention are not described with reference to any particular programming language. It will be appreciated that a variety of programming languages may be used to implement the teachings of the invention as described herein.

Throughout the description of the present invention, reference is made to the term "non-solid-state storage devices" and to the abbreviation "NSSDs". Unless specifically stated otherwise, the terms "non-solid-state storage devices", "NSSDs" and the like shall be used to describe a component which includes one or more data-retention modules which utilize some moving mechanical component in its operation. Non-limiting examples of non-solid-state storage devices include: hard disk drive, hybrid hard drive, holographic data storage, tape drive, optical disk, Compact Disk, Digital Versatile Disc, Bluray disc, floppy Disk, micro-electro-mechanical-system ("MEMS") based storage unit.

Throughout the description of the present invention, reference is made to the term "solid-state data retention devices" or to the abbreviation "SSDRDs". Unless specifically stated otherwise, the terms "solid-state data retention devices", "SSDRDs" and the like shall be used to describe a component or a collection of components that include one or more solid-state data retention units, which independently or in cooperation with other components, is/are capable of persistently storing data thereon. For clarity, it would be appreciated that in some embodiments of the present invention, a SSDRD may include one or more non-volatile data retention units and/or one or more volatile data retention units—the use of which in combination with other components and logic for storing data is described in greater detail below.

Throughout the description of the present invention, reference is made to the term "volatile storage" module or unit and to the abbreviation "VS". These terms are usually related to a component of a storage system whose storage capability is characterized by being "volatile". Terms used herein to describe such volatile components include "volatile storage unit", "volatile storage device", "volatile data-retention unit", and the like. Unless specifically stated otherwise, the terms "volatile storage unit", "volatile storage device", "volatile data-retention unit", and the like, shall be used interchangeably to describe a component which includes one or more data-retention modules whose storage capabilities depend upon sustained power. Non-limiting examples of devices which may be used as part of a volatile storage device include: random-access memory (RAM), dynamic random-access memory (DRAM), static random-access memory (SRAM), Extended Data Out DRAM (EDO DRAM), Fast Page Mode DRAM and including collections of any of the above and various combinations thereof, integrated via a common circuit board, and/or integrated via any type of computer system including, for example, using a blade server. Further details with respect to the operation of the volatile storage devices for persistently storing data shall be provided herein.

Throughout the description of the present invention, reference is made to the term "nonvolatile storage" module, unit or device or to the abbreviation "NVS" module, unit or device. Unless specifically stated otherwise, the terms "nonvolatile storage" module, unit or device and "NVS" module, unit or device and the like shall be used to describe a component which includes one or more data-retention modules that are capable of substantially permanently storing data thereon independent of sustained external power. Non-limiting examples of nonvolatile storage include: magnetic media such as a hard disk drive (HDD), FLASH memory or FLASH drives, Electrically Erasable Programmable Read-Only Memory (EEPROM), battery backed DRAM or SRAM. Non-limiting examples of a non-volatile storage module include: Hard Disk Drive (HDD), Flash Drive, and Solid-State Drive (SSD).

Throughout the description of the present invention reference is made to the term "data-set of the storage system". The term "data-set of the storage system" is used herein to describe the aggregation of all the data that is stored within the storage system. Usually, the data-set of the storage system refers to user data and does not include system data, which is generated by the storage system as part of its operation, and is transparent from a user's perspective. In a storage system, physical storage locations are allocated by the physical storage units of the storage system, and the physical storage locations are usually mapped to logical storage addresses. The logical storage addresses are provisioned by the storage system and collectively represent the storage space provided by the storage system. When a certain data item is written to the storage system it is addressed to one or more logical storage addresses and it is stored within the storage system at the physical storage locations which are mapped to the referenced logical storage address(es). Similarly, when a read request is received at the storage system, the logical storage address(es) referenced by the request is used to determine the physical storage locations where the data item to which the read request relates is stored within the storage system. It would be appreciated that in some storage systems, several (two or more) copies of some portion or of the entire data-set of the storage system may exist. In such implementations, the data-set of the storage system includes the data that is stored in the physical storage locations that are mapped to the logical storage addresses provisioned by the storage system.

Throughout the description of the present invention reference is made to the term "data block" or "block" in short. The terms "data block" or "block" in short are known in the art and the following definition is provided for convenience purposes. Accordingly, unless stated otherwise, the definition below shall not be binding and this term should be construed in accordance with its usual and acceptable meaning in the art. The term "data block" or "block" describes a sequence of bits or bytes having a nominal length ("block size") which together constitute the minimal chunk of data that can be addressed by the storage system. In a hierarchical storage system, such as that with which some embodiments of the present invention are associated, a different block may be defined within each tier or layer of the storage, and consequently, the block size may be varied across layers or tiers. While a block can usually only be referenced as a whole, in some implementations the actual data contained therein may constitute only a portion of the entire block.

Throughout the description of the present invention reference is made to the terms "dirty data blocks" and "dirty data". The terms "dirty data blocks" or "dirty data" are known in the art and the following definition is provided for convenience purposes. In a storage system utilizing primary storage for storing the storage system's data-set and a secondary storage for storing backup data, dirty data refers to any data written to a primary storage entity which is yet to be copied to a secondary backup storage entity. This type of data is referred to as "dirty data" not because of its correctness, but rather because of the temporary unconformity between information in the primary storage and in the secondary storage. Dirty data exists in particular when the backup strategy implemented by the system is asynchronous with the storage of the data within the primary storage.

Throughout the description of the present invention reference is made to the term "backed-up data blocks" and the like. Unless specifically stated otherwise, the term "backed-up data blocks" relates to any data-blocks that are part of the storage system's data set for which there is corresponding backup-data in the system. In a multi-layered storage system, the "backed-up" data may reside within the primary storage layer of the system and the backup data may be stored in a secondary storage layer. The backup data may be used to restore the "backed-up data" in the primary storage layer in case it is lost or corrupted. When for a certain data item within the primary storage layer there is no up-to-date counterpart in the backup storage, this data (in the primary storage layer) is regarded herein as being "dirty data".

Throughout the description of the present invention reference is made to the term "data chunk", "data segment" and in short—"chunk" and "segment", respectively. The terms "data chunk", "data segment", "chunk" or "segment" are known in the art and the following definition is provided for convenience purposes. The terms "data chunk", "data segment" and in short—"chunk" and "segment" describe a sequence of several blocks. Non-limiting examples of a data chunk or segment include: one or more blocks or tracks received by the system from a host, such as a stream of SCSI blocks, a stream of Fiber Channel (FC) blocks, a stream of TCP/IP packets or blocks over TCP/IP, a stream of Advanced Technology Attachment (ATA) blocks and a stream of Serial Advanced Technology Attachment (SATA) blocks. Yet further by way of example, a data chunk or segment may relate to a group of blocks stored in sequence within a storage medium. In this regard, a chunk or a segment relates to a sequence of successive physical storage locations within a physical storage medium.

Throughout the description of the present invention reference is made to the term "I/O command" or "I/O request". These terms are used interchangeably. The terms "I/O command" and "I/O request" are known in the art and the following definition is provided for convenience purposes. Accordingly, unless stated otherwise, the definition below shall not be binding and this term should be construed in accordance with their usual and acceptable meaning in the art.

An "I/O command" or an "I/O request", as generally referred to herein, is an instruction to a storage system with reference to a certain data element that is part of the current data-set of the storage system or that is to become a part of the current data-set of the storage system. Typical types of I/O commands/requests include a read command/request that is intended to instruct the storage system to retrieve a certain data element(s) that is stored within the storage system, and a write command/request that is intended to instruct the storage system to store a new data element(s) within the storage system or to update a previous version of a data element which already exists within the storage system.

It would be appreciated, that many storage interface protocols include different variants on the I/O commands/requests, but often such variants are essentially some form of the basic read and write commands/requests.

By a way of example, the SCSI protocol supports read and write commands on different block sizes, but it also has variants such as the verify command which is defined to read data and then compare the data to an expected value.

Further by way of example, the SCSI protocol supports a write-and-verify command which is effective for causing a respective storage system to store the data to which the command relates and to read the data stored and verify that the correct value was stored within the storage system.

It would be appreciated that certain I/O commands may relate to non-specific data elements while other I/O commands may relate to the entire data set of the storage system as a whole. Such commands may be regarded as a batch command relating to a plurality of data elements and may initiate a respective batch process.

Throughout the description of the present invention reference is made to the term "recovery-enabling data". Unless specifically stated otherwise, the term "recovery-enabling data" and the like shall be used to describe certain supplemental data (R) that is stored within the system possibly in combination with one or more references to data elements which are part of the current data-set of the storage system and which (collectively) enable(s) recovery of a certain (other) data element (D) that is part of the data-set of the storage system. Each recovery-enabling data-element (R) may be associated with at least one original data element (D) which is part of the current data-set of the storage system. Each recovery-enabling data-element (R) may be usable for enabling recovery of the original data element (D) with which it is associated, for example, when the original data (D) is lost or corrupted. A recovery-enabling data-element (R) may enable recovery of the corresponding data element (D) based on the data provided by recovery-enabling data (R) (e.g., the supplemental data with or without references to other data elements) and the unique identity of the respective data element which is to be recovered. Non-limiting examples of recovery-enabling data may include: a mirror of the data element (the supplemental data associated with a data elements is an exact copy of the data element— no need for references to other data elements); parity bits (the supplemental data associated with a data element are the parity bits which correspond to the data element and possibly to one or more other data elements and with or without references to the data element and to the other data elements associated with the parity bits); and error-correcting code (ECC). It would be appreciated that while in order to recover a certain data element, in addition to certain supplemental data (e.g., parity bits), references to the other data elements may be required, the references to the other data elements may be obtained by implementing an appropriate mapping function (or table) and thus, the recovery-enabling data may not be required to include the reference to the other data elements associated with the supplemental data. However, in other cases, each recovery-enabling data element (e.g. parity bits) may include explicit references to each data element that is associated with the respective recovery-enabling data element.

Throughout the description of the present invention reference is made to the term "physical storage location" or "physical storage locations" in the plural. The term "physical storage location" is known in the art and the following definition is provided for convenience purposes. Accordingly, unless stated otherwise, the definition below shall not be binding and this term should be construed in accordance with their usual and acceptable meaning in the art. "Physical storage location" is the representation that is used within a storage system to designate discrete or atomic hardware resources or locations where data can be stored. For example, on a Dynamic Random Access Memory (DRAM) unit, a physical storage location may be each cell of the unit, which is typically capable of storing 1 bit of data. A technology known as "multi-level cell" or "MLC" in abbreviation enables storage of multiple bits in each cell. In a further example, each physical storage location may be associated with a chunk of multiple hardware cells which are monolithically allocated for storing data within the storage device and cannot be individually allocated for storage. Further by way of example, a physical storage location may be defined by to a specific hardware addressing scheme or protocol used by a computer storage system to address I/O requests referencing logical storage addresses to explicit hardware physical storage locations, and each physical storage location may correspond to one more cells of the storage unit and to one or more bits or bytes. Further by way of example, a physical storage address may be a SCSI based physical storage address.

Throughout the description of the present invention reference is made to the term "logical storage address". The term "logical storage address" or the interchangeable term "virtual storage address" is known in the art and the following definition is provided for convenience purposes. Accordingly, unless stated otherwise, the definition below shall not be binding and this term should be construed in accordance with their usual and acceptable meaning in the art. A logical storage address is an abstraction of one or more physical storage locations. As an example, in a block-based storage environment, a single block of information is addressed using a logical unit number (LUN) and an offset within that LUN—known as a Logical Block Address (LBA).

Throughout the description of the present invention reference is made to the term "release" or the like with reference to storage resources. The term "released" as used with reference to storage resource is known in the art and the following definition is provided for convenience purposes. Accordingly, unless stated otherwise, the definition below shall not be binding and this term should be construed in accordance with its usual and acceptable meaning in the art.

The term "release" describes the process of designating that data stored in a certain location(s) (or addresses) in a storage unit may be discarded or written over, and the discard or overwrite operation will not affect the integrity of the data set of the storage unit, for example as presumed by the external host (or hosts) interacting with the data set.

Throughout the description of the present invention reference is made to the terms "destage", "destaging" or the like with reference to data within a storage device or module. Interchangeably with the term "destaging", the term "flush" or "flushing" is also used. The terms "destage", "destaging", "flush" or "flushing" as used herein are known in the art and the following definition is provided for convenience purposes. The terms "destage", "destaging", "flush" or "flushing" relate to the process of copying data from a first data-retention unit to a second data-retention unit, which is typically functionally or otherwise different from the first data-retention unit. In a similar manner the terms "destage", "destaging", "flush" or "flushing" relate to the to the process of copying data from a first data-retention layer or tier to a second data-retention layer or tier. In one non-limiting example, a destaging process may be used for the purpose of releasing the storage resources allocated by the first data retention unit for storing the destaged data.

Reference is now made to FIG. 1, which is a block diagram illustration of a hierarchical storage system including a flushing module, according to some embodiments of the present invention. According to some embodiments the hierarchical storage system 100 includes at least a primary storage tier 10 and a secondary storage tier 20. By way of non-limiting example, the hierarchical storage system 100 may service I/O requests arriving from a plurality of hosts 90. In some embodiments, the primary storage tier 10 is characterized by relatively high performance, in particular in random access (abbreviated herein as "RA"). The secondary storage tier 20 prefers sequential access, and for example, would provide substantially higher throughput when processing sequential write requests compared to non-sequential (random) writes. In a further embodiment, the throughput of the secondary storage tier 20 is generally lower than the throughput in the primary storage tier 10, in particular in random access or at least in random writes.

In some embodiments, the primary storage tier 10 is utilized for storing the entire data-set of the storage system 100. For example, the logical storage space provisioned by the storage system 100 is exclusively associated with physical storage locations on a plurality of data-retention devices 12A-12N underlying the primary storage tier 10. Further according to some embodiments, the secondary storage tier 20 is utilized for backing-up the data within the primary storage tier 10. In the proposed storage system 100 the backing-up of data within the secondary storage tier 20 is asynchronous with the storage of the data within the primary storage tier 10. When a write request is received at the storage system 100, it is initially written into or updated within the primary storage tier 10 and is later stored within the secondary storage 20—asynchronously with the writing of data into the primary storage tier 10.

Further embodiments of the present invention may be applied to a primary storage entity and to a secondary storage entity, where the primary storage entity is a subset of the primary storage tier 10 and the secondary storage entity is a respective subset of the secondary storage tier 20. The first and the secondary storage entities are associated with a specific part of the storage space that is provisioned by the storage system 100 (rather than being associated with the entire storage space provisioned by the storage system 100).

The primary storage entity is used for storing the entire data-set within the specific part of the storage space with which the primary storage entity is associated. Thus for example, a virtual disk that is one of several virtual disks may be provisioned by the storage system 100 and the primary storage entity may be used for storing the entire data-set associated with a specific one of the virtual disks. The secondary storage entity may be used to backup the data within the virtual disk. It would be appreciated that the primary and secondary storage entities may be associated with a portion of a virtual storage entity as well. In this context, the storage system may provision an additional virtual disk, which may or may not be associated with additional hierarchical storage entities pair. For simplicity, the following description is made with reference to an entire storage tier of a storage system; however, it would be appreciated that in some embodiments, the invention may be applied to a portion of a full storage tier.

Continuing with the description of the storage system 100 shown in FIG. 1, by way of example, the array of volatile data-retention units 12A-12N underlying the primary storage tier 10 are used for persistently storing the entire data-set of the storage system 100. The use of volatile data-retention units for persistently storing data is explained in detail below. In another example, the primary storage tier 10 may include an array of Flash storage units which are used for persistently storing the entire data-set of the storage system. Still further by way of example, the secondary storage tier 20 may include an array of standard HDDs. It would be appreciated by those versed in the art that, that RAM modules and Flash storage modules are characterized by relatively high performance, in particular in RA, whereas the HDDs prefer sequential access.

In some embodiments, during normal operation of the system 100, the secondary storage tier 20 is used for backing-up the data within the primary storage tier 10, and possibly is dedicated for backup only. In further embodiments, during normal operation of the system 100, the secondary storage tier 20 is dedicated for handling incoming writes only. It would be appreciated that other modes of operation of the storage system 100 may involve reading data from the secondary storage tier 20. For illustration, during a data-recovery mode of the storage system 100, data may be read from the secondary storage tier 20. The data from the secondary storage tier 20 may be used to recover the integrity of the primary storage tier 10. According to some embodiments, the flushing process described herein generally takes place while the system 100 is in normal operation mode, during which the I/O activity between the primary and the secondary storage tiers 10 and 20 is limited to flushing (writing) data from the primary storage tier 10 to the secondary storage tier 20. Some embodiments of the proposed invention take advantage of the "write only" nature of the interaction with the secondary storage tier 20 during normal operation, as will be apparent from the description of such embodiments below.

The storage system 100 shown in FIG. 1 further includes a flushing management module 50. As mentioned above the backing-up of data within the secondary storage tier 20 is not synchronous with the storage of data within the primary storage tier 10. Consequently, dirty data which has not been backed up within the secondary storage tier 20 may be accumulated within the primary storage tier 10. The flushing management module 50 may be adapted to manage the destaging of data from the primary storage tier 10 to the secondary storage tier 20, and in particular the destaging of dirty data.

Figure 2:
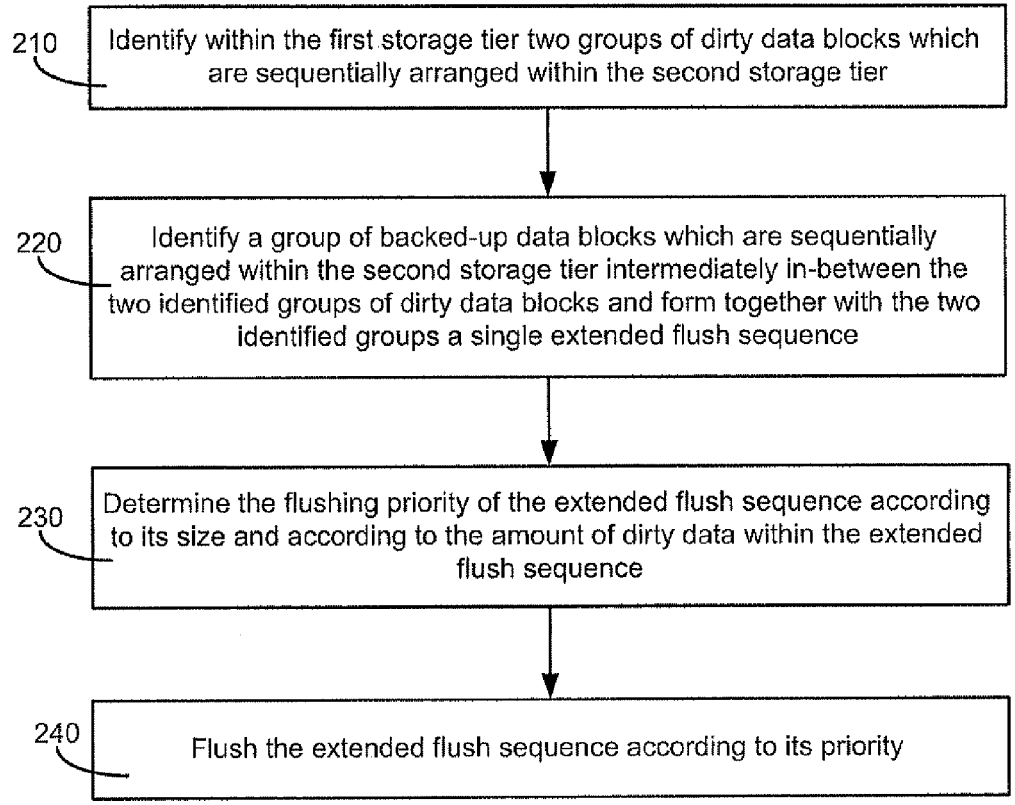
FIG. 2 is a flowchart illustration of a method of managing flushing of data within a hierarchical storage system, according to some embodiments.

The flushing management module 50 includes a map of the secondary storage tier 52. Reference is now additionally made to FIG. 2 which is a flowchart illustration of a method of managing flushing of data within a hierarchical storage system, according to some embodiments. The flushing management module 50 may be adapted to use the map of the secondary storage tier 52 (and possibly also a map of the primary storage tier) to scan the primary storage tier 10, or some portion thereof, to identify groups of dirty data blocks which are comprised of dirty data blocks arranged in a successive sequence (hereinafter "arranged in a sequence") within the secondary storage tier 20 (block 210). It would be appreciated that the dirty data may include data for which there are no pervious versions within the secondary storage tier 20 (it is new data), and in this case succession is determined according to the location where the new data should be stored within the secondary storage tier 20.

In some embodiments, the map of the secondary storage tier 52 may directly map physical blocks within the secondary storage tier 20 to respective physical storage blocks from the primary storage tier 10. However, other implementations are also possible, for example, the primary and the secondary storage tiers 10 and 20 may each be mapped to a common reference map and in order to determine the counterpart of a certain secondary storage tier 20 block within the primary storage tier 10, the reference map may be consulted. Further by way of example, the reference map may be associated with a virtual logical storage space, and each of the maps of the primary and the second storage tiers 10 and 20 may correlate the physical storage locations provided by the data-retention media underlying each tier, respectively, with the logical storage addresses within the common logical storage space.

The flushing management module 50 may further use the map of the secondary storage tier 52 to scan the primary storage tier 10, or some portion thereof, to identify a group of backed-up data blocks which are arranged within the secondary storage tier 20 in a successive sequence intermediately in-between the two identified groups of dirty data blocks (block 220) and combine the group of backed-up data blocks together with the two identified groups of dirty data blocks to form a single extended flush sequence. It would be appreciated that the extended flush sequence may not necessarily be arranged in a successive sequence within the primary storage tier 10, but does form a single sequence within the secondary storage tier 20. For illustration, in one non-limiting example, a thin provisioning storage resources allocation routine may be implemented by the secondary storage tier 20, and so the allocation of physical resources within the secondary storage tier 20 is not aligned with the addressing scheme that was used for mapping the primary storage tier 10. Accordingly, the footprint of an extended flush sequence which forms a single sequence within the secondary storage tier 20 is typically not sequential within the primary storage tier 10.

The flushing management module 30 may be adapted to handle a plurality of pending flush sequences, including at least one pending extended flush sequence. The flushing management module 30 may determine the flushing priority of the extended flush sequence according to its size and according to the amount of dirty data within the extended flush sequence (block 230). The flushing management module 30 then flushes the extended flush sequence according to its priority (block 240). The process of determining the flushing priority of the extended flush sequence, as well as the process of flushing the extended flush sequence, shall be described in greater detail below.

In some embodiments, flushing the extended flush sequence may involve retrieving from the primary storage tier 10 the different blocks which constitute the extended flush sequence and placing them within a flush buffer 60. It would be appreciated that the retrieval of the blocks from the primary storage tier 10 is a relatively short process, since the primary storage tier 10 is characterized by relatively high performance, in particular in RA. Such high performance in RA is a known attribute of Flash drives and of DRAM modules, for example. The use of volatile data-retention units for persistently storing data is explained in detail below. Accordingly, even if the blocks are distributed in a non-sequential manner across the storage media underlying the primary storage tier 10, their retrieval is relatively quick. Buffers are also relatively high-performance data-retention devices (typically RAM modules are used) including in RA, and so the entire read and write cycle involved in the loading of the flush buffer with the extended flush sequence is relatively quick.

Furthermore, according to some embodiments, the performance characteristics of the primary storage tier 10 and the ability to swiftly retrieve non-sequential (and sequential) blocks therefrom, enables a comprehensive search over a substantial portion of the storage space (e.g., the entire storage space) of the storage system 10. It would be appreciated that, since the primary storage tier 10 is the main storage facility of the storage system 100 and is used to store the entire data-set of the storage system 100, the search for an intermediary backed-up data sequence which can be used to join two sequences of dirty data that are fragmented relative to one another by the sequence of backed-up data, is significantly higher compared to storage systems where the search for intermediary sequence is limited to the data within some buffer or cache which hold only a portion (and often a relatively small portion) of the entire data-set of the storage system.

Having described a general concept of identifying and forming an extended flush sequence within a hierarchical storage system according to some embodiments of the present invention, there is now provided a description of feature embodiments of the invention related to a scan policy which may be implemented by the flushing management module 50 to set forth certain aspects of the scanning for a flush sequence.

According to some embodiments, the flushing management module 50 may include a scan policy module 54 which sets forth the policy according to which the search for a flush sequence is carried out. In still further embodiments, the flushing management module 50 may run a process of identifying multiple flush sequences and may prioritize the flush sequences found—for flushing thereof. The configurations and criteria for the process of identifying multiple flush sequences and prioritization thereof may be provided by the scan policy module 54.

According to some embodiments, the scan policy module 54 may set forth a chunk size for the search for flush sequences. A chunk is a sequence of consecutive physical storage locations within the secondary storage tier 20. For convenience, in the following discussion a chunk is assumed to have a fixed size and spans a fixed number of sequential blocks within the secondary storage tier 20. In some embodiments, there are a plurality of data-retention devices 22A-22M which underlie the secondary storage tier 20, and according to one implementation of the present invention, the segmentation to chunks takes into account the range of physical resources allocated by each of the data-retention devices 22A-22M, so that each chunk is associated with only one of the data-retention devices 22A-22M. In some implementations of the secondary storage tier 20 this segmentation scheme supports sequential writes of data within each chunk. However, as will be discussed below, in other implementations of the secondary storage tier 20 a chunk will span two or more different data-retention devices—to support sequential writes.

Figure 3:
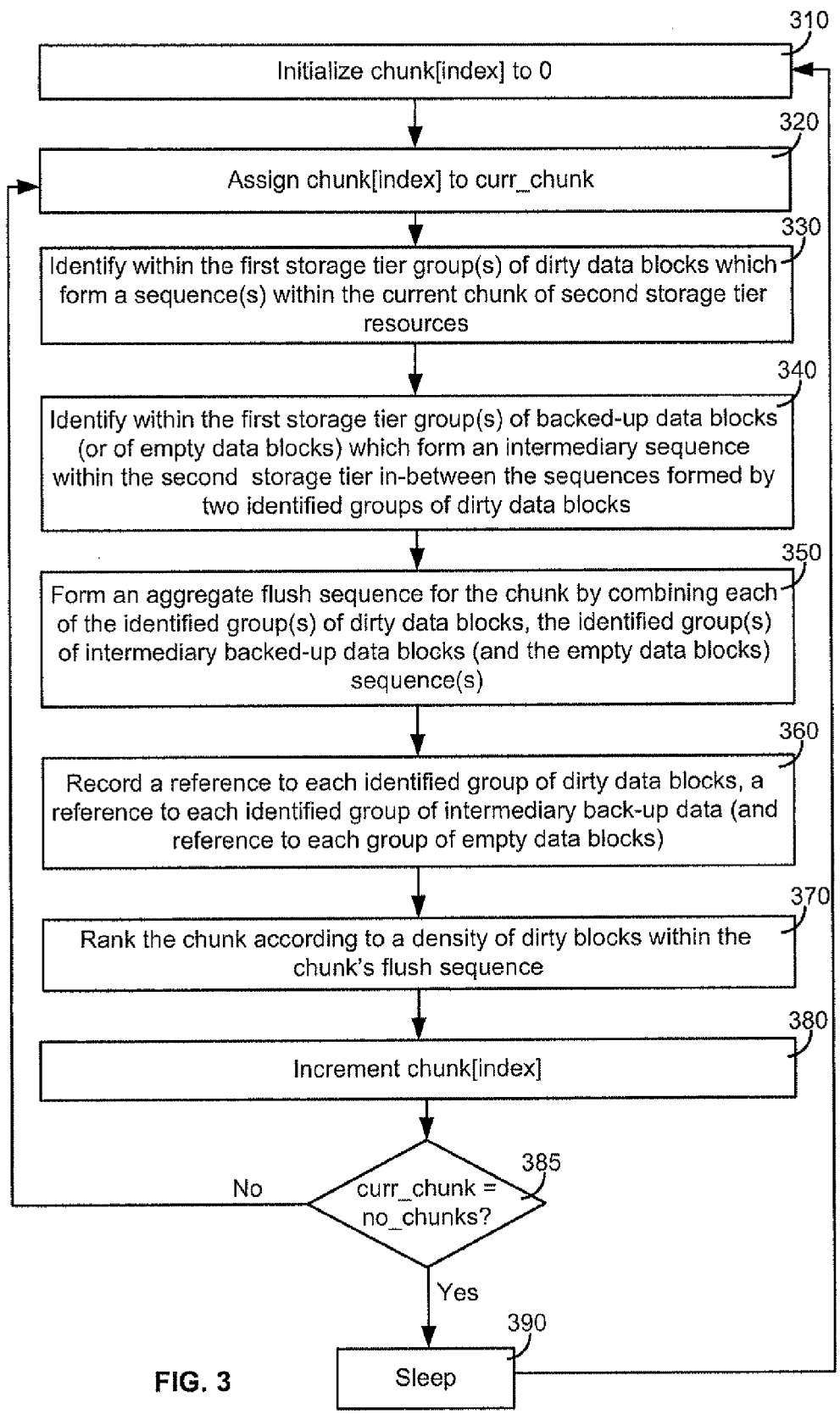
FIG. 3 is a flowchart illustration of one example of a process of scanning the primary storage tier to identify flush sequences (including extended flush sequences) and ranking of the flush sequences, according to some embodiments of the present invention.

Continuing with the description of a process of identifying multiple flush sequences (including extended flush sequences) and for prioritizing the flushing thereof, according to some embodiments of the present invention, reference is now made to FIG. 3, which is a flowchart illustration of one example of a process of scanning the primary storage tier to identify flush sequences (including extended flush sequences) and ranking of the flush sequences, according to some embodiments of the present invention. According to some embodiments, the flushing management module 50 may include a scanning module 51 that is configured to search the primary storage tier 10 for flush sequences one chunk at a time. The process is initiated with the setting of a chunk index to zero (blocks 310) and setting the chunk counter according to the current chunk index (block 320).

Next, the blocks within the primary storage tier 10 which are associated with the current chunk are scanned to identify one or more groups of dirty-data blocks which form a sequence(s) within the current chunk (block 330). As mentioned above, the group of dirty data blocks forming a sequence within the current chunk are not necessarily arranged in sequence within the primary storage tier 10, but are mapped to successive physical storage locations within the secondary storage tier 20—and in particular to sequential physical storage locations within the current chunk (which is itself a collection of sequential physical storage locations within the secondary storage tier 20).

The scanning module 51 scans the primary storage tier 10 for any group(s) of backed-up data blocks which form an intermediary successive sequence within the secondary storage tier 20 in-between the sequences formed by identified groups of dirty data blocks (block 340). In some embodiments, the scanning module 51 may scan the primary storage tier 10 also for any group(s) of empty data blocks which form an intermediary sequence within the secondary storage tier 20 in-between the sequences formed by identified groups of dirty data blocks. It would be appreciated that if, within the secondary storage tier 20, in between two groups of dirty data blocks there are some backed-up data blocks and/or some empty data blocks, the intermediate backed-up and/or empty data blocks may form a single group. The flushing management module 50 may be adapted to form an aggregate flush sequence for the chunk by combining each of the identified group(s) of dirty data blocks, the identified group(s) of intermediary backed-up data blocks and of the empty data blocks (block 350).

It would be appreciated, that the scanning for empty blocks and in particular for empty data blocks which form an intermediary sequence within the secondary storage tier 20 in-between the sequences formed by identified groups of dirty data blocks, and the padding of the flush sequence with empty blocks is optional. It would be further appreciated, that in an implementation of the storage system 100 wherein a thin provisioning routine is used for managing the allocation of physical storage resources within the secondary storage tier 20, empty blocks would typically never occur in-between blocks that were provisioned for storing data (whether valid or not), and in such cases it is meaningless to scan the primary storage tier 10 for empty data blocks which are arranged intermediately between data that is stored within the secondary storage tier 20 (whether valid or not). Accordingly, the reference made to empty data or empty block in the discussion of certain embodiments below is optional and is not meant to limit the implementation of the present invention in this regard.

The flushing management module 50 may include a dedicated padding module 56 that is responsible for the padding operation and for the forming of aggregate flush sequences. According to some embodiments, the flushing management module 50 or the padding module 56 implemented as part thereof, may be configured to record a reference to each identified group of dirty data blocks, a reference to each identified group of intermediary back-up data, and reference to each group of empty data blocks (block 360).

It would be appreciated that when backed-up data from the primary storage tier 10 is written over the corresponding back-up data in the secondary storage tier 20, the result is an overwrite operation. It would be further appreciated that since the overwrite operation is sequential there is a relatively low penalty in terms of the overhead involved, and on the other hand, the overwrite operation would allow the writing into the secondary storage tier 20 two (or more) sequences of dirty data with a single sequential write. Padding with empty data blocks which form an intermediary sequence within the secondary storage tier 20 in-between the sequences formed by identified groups of dirty data blocks serve a similar purpose and involve a similar overhead, namely writing—in sequence—"empty" data (for example "0"'s or random values).

While in some cases the flush sequence for a certain chunk may be formed by combination of two or more groups of dirty data blocks and one or more groups of dirty data blocks and/or empty data blocks, for some chunks the flush sequence may include only one group of dirty data blocks. A flush sequence which consists of dirty data blocks only may occur, for example, when the entire chunk is comprised of dirty data blocks. Other scenarios would also be apparent to those versed in the art.

Continuing with the description of FIG. 3, following the identification of the flush sequence, the flushing management module 50 may rank the chunk according to a density of dirty data blocks within the chunk's identified flush sequence (block 370). The flushing management module 50 may include a dedicated chunk density calculation module 55 that is operable for carrying out the density calculation. The ranking of the chunk may be relative to other chunks or it may be related to some predetermined scale which quantifies the density of dirty blocks within that chunk's identified flush sequence. In some embodiments, the chunk density calculation module 55 may be configured to assign a relatively high ranking to flushing sequence wherein the density of dirty blocks is relatively high. Thus for example, in case two flush sequences are of the same total size but the density of dirty blocks is different among the two flush sequences, the flush sequence with a greater dirty blocks density would receive a higher ranking. In further embodiments, the greater the amount of dirty data within a flush sequence the higher the rank it would receive from the chunk density calculation module 55, all other things being equal. Thus for example, in case two flush sequences are characterized by an equal dirty blocks density, the larger flush sequence would receive a higher ranking.

The flushing management module 50 may proceed to increment the flush chunk index (block 380) and check if there are any more chunks left for ranking (block 385).

According to some embodiments, blocks 320-385 are repeated for each chunk and once all the chunks have been ranked the chunk scanning process may enter a sleep mode (block 390) and a flushing process may be initiated for flushing the identified flush sequences according to their respective ranking. The scanning process wakes up and is repeated as necessary.

According to some embodiments, and by way of non-limiting example, the flushing management module 50 may implement a sorted list of flush sequences which is used for queuing the flush sequences. The position of each flush sequence within the sorted list may be determined according its respective rank (or relative rank). When resources of the storage system 100 that are used for flushing data to the secondary storage tier 20 become available, the flushing sequence at the top of the sorted list is selected and its flushing is initiated. The selected flushing sequence is removed from the sorted list and the sorted list is thus updated. Further aspects of the flushing procedure are discussed in further detail below. It would be appreciated that many other triggers may be implemented in the system for initiating the flushing of a flush sequence from the top of the sorted list. In addition there are various other queuing procedures which may be used in further embodiments of the invention.

As mentioned above, the data which is part of each identified flush sequence may be brought into a flush buffer 60 and may be arranged in the appropriate sequential order (according to the map of the secondary storage tier 20). Once the entire flush sequence is within the flush buffer 60, flushing management module 50 may enable the flushing of the flush sequence from the flush buffer 60. The flush buffer 60 is adapted to write the flush sequence into the sequence of physical storage locations within the respective secondary storage tier 20 chunk which corresponds to the assembled flush sequence. The scanning and flushing processes may be implemented in software, in hardware or in any combination thereof. It would be appreciated that the scanning and flushing processes may be implemented as software programs (or services) running on a computer processor.

According to some embodiments, the storage system 10 may include a plurality of flush buffers and may utilize a plurality of channels for facilitating parallel flushing of a plurality of flush sequences. The flushing management module 50 may include a write-request dispatcher 58 which is adapted to utilize a plurality of threads or may include a plurality of registries to support parallel multi-flushing processes. At each point during the flushing processing, the write-request dispatcher 58 may select a number of identified flush sequences to be destaged to the secondary storage tier 20, according to their respective ranking. For example, the flushing management module 50 may select a number of the highest ranked identified flush sequences, and may load the flush sequences into a respective number of flush buffers 60.

The write-request dispatcher 58 may provide the actual instruction for each of the flush buffers 60 to commence the writing to the respective secondary storage tier 20 data-retention unit when the loading of the flush sequence to the respective buffer 60 is complete. The write-request dispatcher 58 may be configured to delay one or more dispatch instructions in accordance with various system performance parameters relating to the operation state of one or more components of the storage system 100. For example, the write-request dispatcher 58 may be configured to delay a dispatch instruction related to a certain data-retention unit in case a previous flush sequence was recently destaged to the same data-retention unit and the write-request dispatcher 58 estimates or determines that the data-retention unit is not yet ready to handle the additional flush sequence.

According to some embodiments of the invention, the scan policy module 54 may set forth a minimal and/or a maximal group size for one or more of: a group of dirty-data blocks which form a sequence(s) within the secondary storage tier 20; a group of backed-up data blocks which form an intermediary sequence within the secondary storage tier 20 in-between the sequences formed by two identified groups of dirty data blocks; a group of empty data blocks which form an intermediary sequence within the secondary storage tier 20 in-between the sequences formed by two identified groups of dirty data blocks; and a group of blocks constituting a flush sequence.

The minimal and/or a maximal group size for each of the above may be fixed, or in further embodiments, the scan policy module 54 may be configured to adjust the minimal and/or maximal group(s) size(s) or to set it dynamically according to one or more predefined criteria. In some embodiments, the minimal and/or maximal group(s) size(s) may depend upon (at least in part) specific storage hardware parameters related to the actual data-retention units underlying the secondary storage tier 20. For example, the scan policy module 54 may set forth a target throughput parameter for one or more of the specific storage hardware units underlying the secondary storage tier 20, and the minimal and/or maximal group(s) size(s) for the chunks associated with that storage hardware unit may be set according to the target throughput parameter. According to some embodiments, the minimal and/or maximal group(s) size(s) may be dynamically adjusted, for example, on-the-fly.

For example, the minimal size of a group of dirty-data blocks that is taken into account when calculating the dirty data density within a given chunk may be some functions of the average size of all the sequences within the secondary storage tier 20 formed by dirty data blocks within the primary storage tier 10.

As mentioned above, in one configuration of the scan process, the size of each chunk, which serves as a reference for the scan process, is fixed. However in further embodiments, the chunk size may vary from chunk to chunk (within the same scan cycle) and/or the chunk size may vary from one scan cycle to another.

In one example, the size of each chunk of consecutive physical storage locations within the secondary storage tier 20 that is searched for flush sequences may be determined according to considerations of overhead and accuracy. In case the chunk size is relatively small, the management of the scanning process may involve a relatively large amount of overhead. This is because, in some embodiments, the amount of entries to calculate rank and to scan is larger. Conversely, using a large chunk size may increase the accuracy of the scanning process, since the number of blocks within each chunk is smaller, so the distribution of the dirty blocks within the chunk is on average more constant over the size of the chunk.

Further by way of example, dynamic adjusting the size of the chunk can be done according to the distribution of dirty blocks by calculating the resource overhead of the rank calculation and the management of the priority structure and adjusting the chunk size to not consume more resources than a specified limit that is determined by the resources available.

According to some embodiments, the scan policy module 54 may set forth additional criteria which may effect the prioritization of the flushing process. For example, the scan policy module 54 may provide an aging factor. In one example of an application of the aging factor, whenever a flush sequence is flushed, a timestamp associated with the corresponding chunk is updated with the current time. During the subsequent scan cycle the timestamp for each chunk is read and the rank of each chunk is influenced by the duration since the last flush associated with that chunk—relative to the other sequences. Further by way of example, instead of a timestamp, a counter may be used. The counter associated with a chunk may be reset whenever a flush sequence that is associated with the chunk is flushed, and for each chunk in respect of which no flushing took place during the flush cycle the counter is incremented. During each flush cycle, the counter of each chunk is read and its rank is determined at least in part according to its respective counter.

Further by way of non-limiting example, the following function may be used to rank chunks:

$$\text{rank} = \text{aging} * (\text{no\_modified\_blocks} * \text{density\_factor} + (X * \text{no\_sequences})^2) \quad \text{Formula\_1}$$

where, aging is an aging factor associated for example with the counter associated with each chunk that was described above, the no_modified_blocks represents the number of modified blocks in the flush sequence, the density_factor denotes a scaling factor for scaling the number of modified blocks in the flush sequence, no_sequences represents the number of groups of dirty data blocks which are sequentially arranged within the secondary storage tier 20 which are larger than a predefined minimum size.

Figure 4:
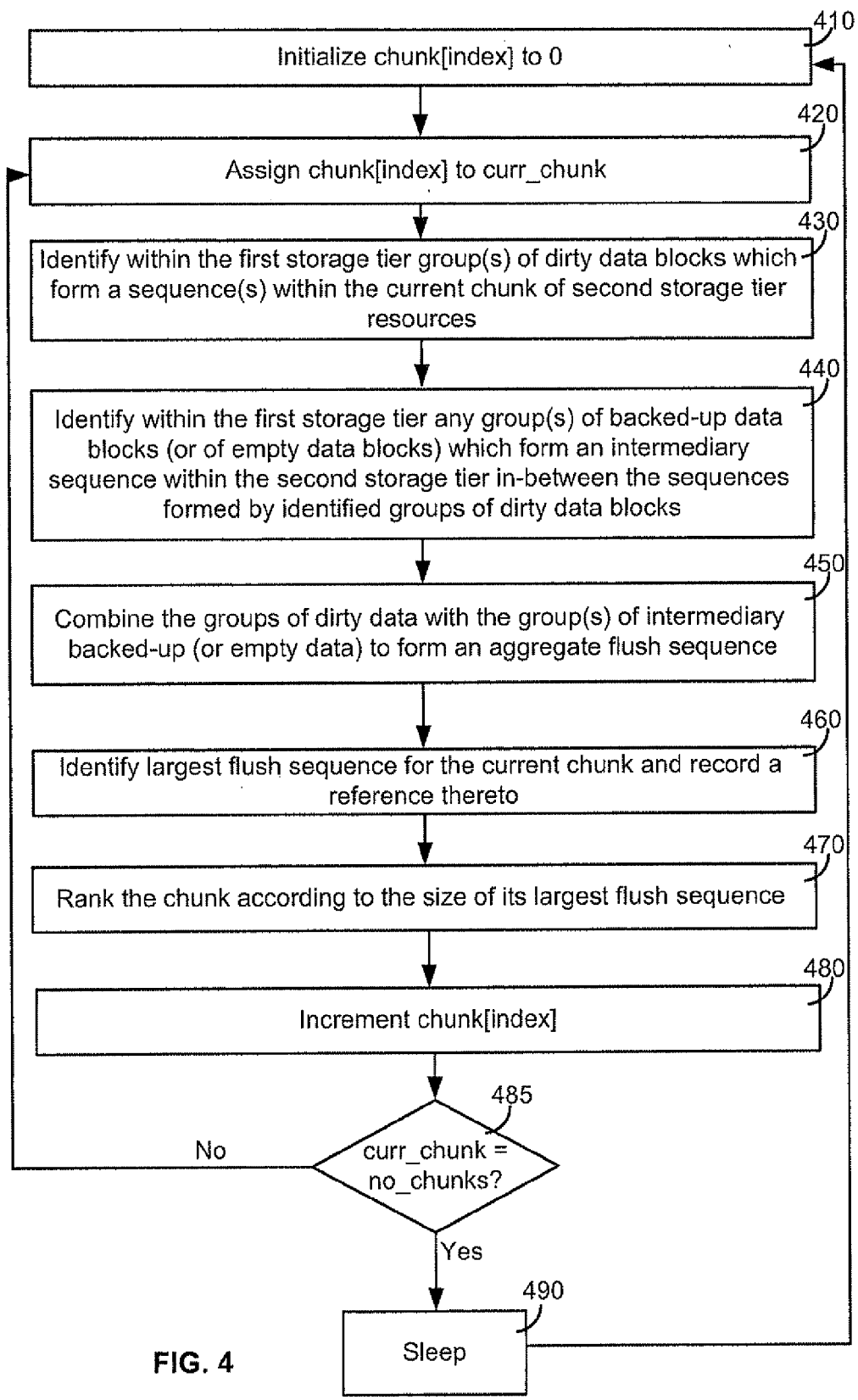
FIG. 4 is a flowchart illustration of another example of a process of scanning the primary storage tier to identify flush sequences (including extended flush sequences) and ranking of the flush sequences, according to some embodiments of the present invention.

Having described on example of a process of scanning the primary storage tier to identify flush sequences (including extended flush sequences) and ranking of the flush sequences, there is now provided a further example of such a process according to further embodiments of the invention. Referring now to FIG. 4, there is shown a flowchart illustration of another example of a process of scanning the primary storage tier to identify flush sequences (including extended flush sequences) and ranking of the flush sequences, according to some embodiments of the present invention. According to some embodiments, the scanning module 51 may be configured to search the primary storage tier 10 for flush sequences, one chunk at a time. The process is initiated with the setting of a chunk index to zero (blocks 410) and setting the chunk counter according to the current chunk index (block 420).

Next, the blocks within the primary storage tier 10 which are associated with the current chunk are scanned to identify one or more groups of dirty-data blocks which form a sequence(s) within the current chunk (block 430), and for any group(s) of backed-up data blocks or of empty data blocks which form an intermediary sequence within the secondary storage tier 20 in-between the sequences formed by identified groups of dirty data blocks (block 440). The flushing management module 50 may be adapted to form an aggregate flush sequence for the chunk by combining each of the identified group(s) of dirty data blocks, the identified group(s) of intermediary backed-up data blocks and of the empty data blocks (block 450).

Once all the flush sequences (aggregate or not) for the chunk are identified, the flushing management module 50 may be adapted to identify the largest flush sequence for the current chunk and record a reference thereto (block 460). In one example, the largest flush sequence may be the sequence with the largest number of blocks in it, regardless of whether the blocks are dirty data blocks, backed-up blocks or empty blocks. In another example, the largest flush sequence may be the sequence with the largest number of dirty data blocks in it.

Following the identification of the largest flush sequence, the flushing management module 50 may rank the chunk according to the size of its largest flush sequence (block 370). The flushing management module 50 may simply compare the size of the largest flush sequence for the current chunk with the size of the other chunks and may rank it accordingly. In one example a sorted list may be used and may be updated with each chunk ranking.

The flushing management module 50 may proceed to increment the flush chunk index (block 480) and check if there are any more chunks left for ranking (block 485).

According to some embodiments, blocks 420-485 are repeated for each chunk and once all the chunks have been ranked the chunk scanning process may enter a sleep mode (block 490) and a flushing process may be initiated for flushing the identified flush sequences according to their respective ranking. The scanning process wakes up and is repeated as necessary.

Having described various implementations of the scanning procedure and of the flushing procedure according to some embodiments of the present invention, there is now provided a discussion of the application of the present invention to storage systems which implement various management schemes for managing the different storage tiers. In the discussion below, the physical storage space associated with the primary storage tier is a sequential collection of physical storage locations. Different ranges of the physical storage locations underlying the storage space may be allocated by and associated with different data retention units which are part of the primary storage tier, but each such range is comprised of consecutive physical storage locations and is in sequence with one or two other ranges that are associated with respective one or two of the other data retention units underlying the primary storage tier. This configuration is sometimes referred to a spanning or Just a Bunch of Disks (JBOD). For simplicity this is the configuration of the primary storage tier in the following example. However, it would be appreciated by those versed in the art that the principles described below apply to a storage system wherein the primary storage tier—where the entire data-set is kept and which is characterized by high performance in particular in RA—is managed according to a different scheme including standard RAID of various levels, certain proprietary RAID configurations, etc.

Similarly, in the discussion below the storage space associated with the secondary storage tier is stripped across 5 different data retention units (disks in this example) with distributed parity (or interleaved parity) in accordance with a RAID Level 5 configuration. It would be appreciated that the secondary storage tier can also be managed according to a different scheme including JBOD (or spanning), other standard RAID of various levels, certain proprietary RAID configurations, etc.

In some embodiments of the invention, the storage system, or the flushing management module utilized by it, takes advantage of the high performance of the primary storage tier, in particular in RA and of the fact that the entire data set is stored within the primary storage tier to combine together within a single flush sequence two or more groups of dirty blocks—which are not sequential to one another within the secondary storage tier, and possibly backed-up and/or empty data blocks and/or data protection blocks to form an aggregate flush sequence to allow the flushing of more dirty data in one sequential write stream than would have been possible otherwise.

The high RA performance enables the aggregation of the various blocks into the flush sequence, including blocks which do not contain dirty data. The high RA performance enables quick retrieval of intermediary backed-up data blocks dispersed within the primary storage space. Similarly, in some configurations, intermediate empty data blocks are quickly identified and padding data (e.g., zeros) is added to the flush sequence.

In addition, in case the secondary storage tier implements a data protection scheme which involves calculation of parity or a similar procedure which involves further data in addition to the modified block (the dirty data block), and the primary storage tier has a different protection scheme or none, high RA performance enables the retrieval of the additional data required by the protection procedure (usually other member blocks of the parity set) and the protection data can be calculated and added to the flush sequence within a relatively small amount of time.

Thus the padding operation does not impose a significant time penalty (latency) and the high RA performance together with the availability of the entire data set for parity calculation and padding, enables the formation of a flush sequence which includes more dirty data and can be written in a single sequential write.

Figure 5:
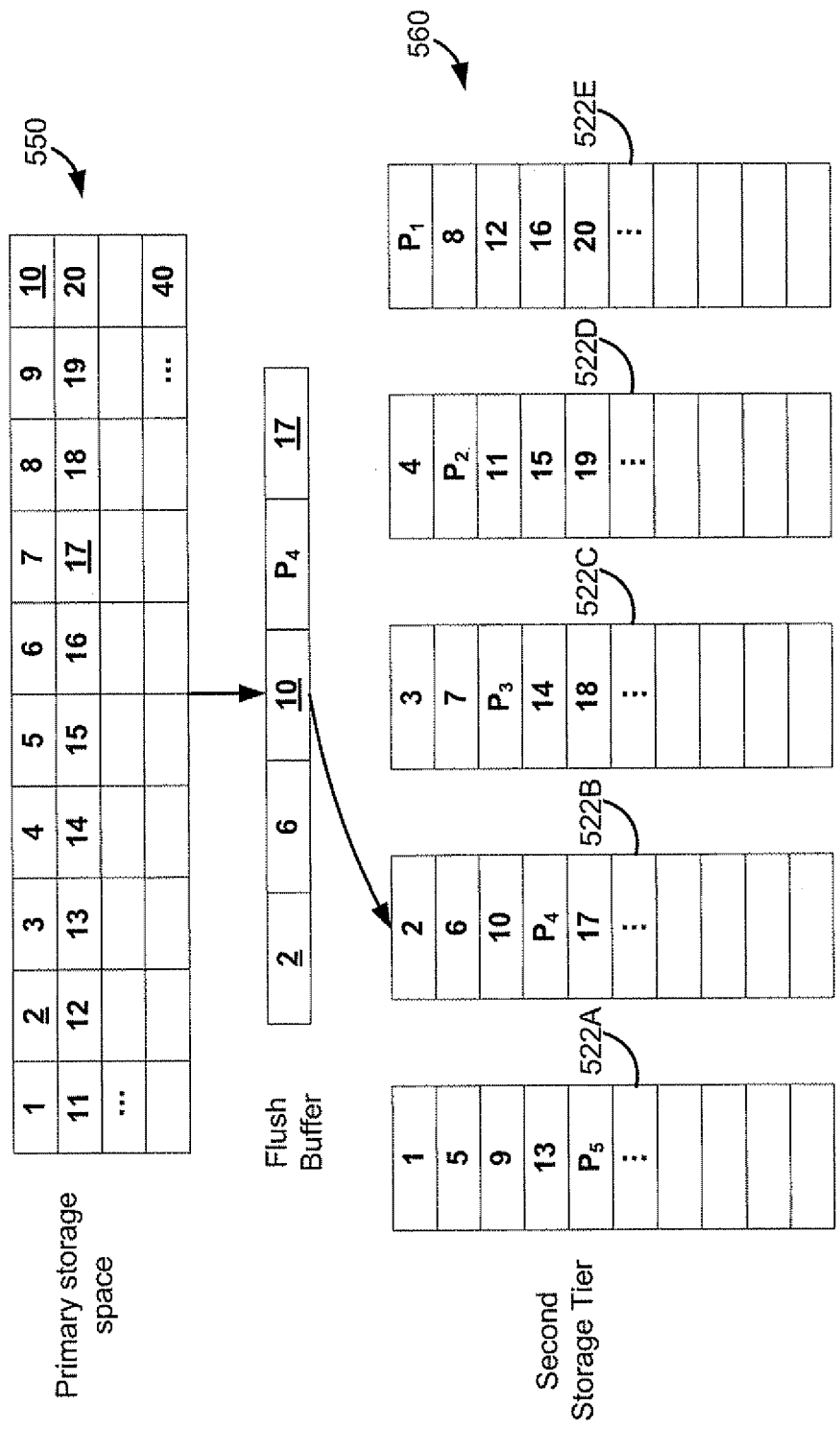
FIG. 5 is a graphical illustration of certain aspects of forming a flush sequence, according to some embodiments of the present invention.

Reference is now made to FIG. 5 which is a graphical illustration of certain aspects of forming a flush sequence, according to some embodiments of the present invention, within a system where the primary storage tier is managed as a JBOD and the secondary storage tier is managed according to RAID Level 5. It would be appreciated that for brevity of description FIG. 5 is a simplified view of the storage spaces allocated by the primary storage tier and by the secondary storage tier and of the storage areas associated with the data-retention devices underlying the first and secondary storage tiers, as well as the storage area of the flush buffer. By way of example, the description of FIG. 5 is made with further reference to the hierarchical storage system of FIG. 1. The processes described with reference to FIG. 5 may be implemented on other hierarchical storage system configurations.

As is shown in FIG. 5, the data retention devices 12A-12N underlying the primary storage tier 10 may be managed as a JBOD. The physical storage locations provided by the data retention devices 12A-12N underlying the primary storage tier 10 are provisioned as a sequential collection of physical storage locations (enumerated 1-40 in FIG. 5). Different ranges of the physical storage locations 1-40 underlying the storage space 550 are associated with the different data retention units 12A-12N, but each such range is comprised of consecutive physical storage locations and is in sequence with one or two other ranges, forming a single sequential storage space. For simplicity, in FIG. 5 a single monolithic sequence of the physical storage locations 1-40 is shown for the primary storage tier 10.

The storage space 560 associated with the secondary storage tier 20 is stripped across five different data retention units 522A-522E, disks for example, with distributed parity (or interleave parity) in accordance with a RAID Level 5 configuration. Accordingly, a sequence on each of the five different data retention units 522A-522E underlying the secondary storage tier 20 includes data which is non-sequentially arranged within the storage space 550 associated with the primary storage tier 10, and generally, each fifth block within the storage area of each of the five data retention units 522A-522E underlying the secondary storage tier 20 is a parity block. Parity blocks are marked in FIG. 5 as $P_1$-$P_5$. Parity blocks are computed for data brought to (or stored within) the secondary storage tier 20, and is not stored within the primary storage space 550.

According to some embodiments, flushing management module 50 may scan the primary storage space 550 for groups of dirty data blocks which are sequentially arranged within the secondary storage tier 20. As was discussed above, the search may be segmented to chunks. A chunk is a sequence of consecutive physical storage locations within the secondary storage tier 20. For example, with reference to FIG. 5, the flushing management module 50 may be engaged in the scanning of blocks within the primary storage 550 which forms a sequence within the chunk formed by the blocks on data retention unit 522B, namely blocks 2, 6, 10 and 17. The scan may involve searching for groups of dirty data blocks which are comprised of dirty data blocks arranged in sequence within the secondary storage tier 20.

In some embodiments, for practical reasons, the search is focused on groups of dirty data, but it can be expanded to include individual dirty data blocks as well. For simplicity, the "groups" of dirty data blocks identified in FIG. 5 are individual blocks. Thus for example, the scan for groups of dirty data blocks may identify dirty data blocks 2, 10 and 17, although they do not, individually, constitute a "sequence" of dirty blocks. Those versed in the art would be readily able to apply the discussion herein to groups (rather than individual blocks) comprised of at least n blocks which form a sequence within a chunk of consecutive physical storage locations within the secondary storage tier 20.

The identified dirty data blocks 2, 10 and 17, each representing a group of dirty data blocks within a chunk of the secondary storage tier 20 associated with data retention unit 522B are not in sequence with one another. However, further as a result of the scan within the primary storage tier 10, the flushing management module 50 identifies a group of backed-up data blocks which are sequentially arranged within the chunk and are intermediate in-between two of the identified groups of dirty data blocks, namely backed-up data block 6 which is sequentially arranged within the chunk intermediately in-between dirty data blocks 2 and 10. In a similar manner, in some configurations, the flushing management module 50 may identify a group of empty blocks which are intermediate in-between two of the identified groups of dirty data blocks. In a further example, the flushing module 50 may identify a group which is comprised of a combination of backed up data blocks and empty blocks which collectively form a sequence within the secondary storage that is intermediate in-between two of the identified groups of dirty data blocks.

In addition, according to some embodiments, the flushing management module 50 may identify parity blocks or parity sequences of blocks which are intermediate in-between the identified groups of dirty data blocks. For example, in FIG. 5 the parity block marked $P_4$ is located within the secondary storage tier 20 in between blocks 10 and 17, which are associated with dirty data within the primary storage tier 10. The parity block marked $P_4$ is associated with data blocks 13-16. The primary storage tier 10 does not have a parity based protection scheme and the parity data, in particular $P_4$, is not available within the primary storage tier 10. Therefore, if parity block $P_4$ is to be included in the flush sequence, it needs to be calculated. Thus, in accordance with some embodiments, the flushing management module 50 is responsive to identifying a parity block or a parity sequence which is intermediate in-between identified groups of dirty data blocks for calculating the parity data and including it in the flush sequence in-between the respective groups of dirty data blocks. In the case of FIG. 5 the flush management module 50 may retrieve the data in blocks 13-16 which are associated with the parity block marked $P_4$, calculate the value of $P_4$ and add to the flush sequence in-between dirty data blocks 10 and 17.

It would be appreciated that since the primary storage tier 10 is characterized by high RA performance, retrieval from the primary storage tier 10 of the additional data blocks (blocks 13-16) which required the calculation of the parity data (the parity block marked $P_4$), is relatively quick. Since the flush buffer 60 is also a high performance data-retention unit, in particular in RA, the writing of the parity data into the flush sequence is also relatively quick.

Once the flush sequence with the groups of dirty data blocks, backed-up and/or empty data blocks and/or parity data blocks is assembled, it is flushed as a single sequence from the flush buffer 60 to the secondary storage tier 20. In FIG. 5, the flush sequence is flushed to the disk device marked 522B as a single sequential write request, and the disk 522B is thus able to write the entire sequence as a single sequence. Seek times involved in the writing of the multiple groups of dirty data are thus substantially eliminated or reduced, whereas otherwise the writing of the groups of dirty data could have involved substantially seek and other latency inducing activity that is associated with non-sequential writes to disk.

Thus far, embodiments of the invention were described with reference to a particular configuration of an hierarchical storage system which is comprised of a primary storage tier and a secondary storage tier, the primary storage tier is characterized by relatively high performance, in particular in RA and is used for storing the entire data-set of the storage system, and the secondary storage tier prefers sequential access, so that the throughput of the secondary storage tier is generally lower than the throughput of the primary storage tier, in particular in random access or at least in random writes, and the secondary storage tier is used for asynchronously backing up the primary storage tier. However, it would be appreciated that other configurations of a hierarchical storage system exist, which include a primary storage tier, characterized by relatively high performance, in particular in RA, and used for storing the entire data-set of the storage system, and a secondary storage tier which prefers sequential access and is used for asynchronously backing up the primary storage tier.

In a further example, some embodiments of the present invention may be applied to the hierarchical storage system disclosed in co-pending U.S. Provisional Application Ser. No. 61/193,079 and in the corresponding PCT application No. IL2009/001005 filed Oct. 27, 2009, both of which are assigned to a common assignee, and both of which are incorporated by reference in their entirety into the present disclosure. The storage system disclosed in U.S. Provisional Application Ser. No. 61/193,079 and in the corresponding PCT application No. IL2009/001005 filed Oct. 27, 2009 includes a primary storage space, a temporary backup storage space, a permanent backup storage space, a storage controller and one or more uninterrupted power supply ("UPS") units.

The primary storage ("PS") space is associated with a plurality of volatile storage ("VS") devices and is used for persistently storing the entire data-set of the storage system. The temporary backup storage ("TBS") space is also associated with a plurality of VS devices. The permanent backup storage ("PBS") space is associated with nonvolatile storage ("NVS") devices. The controller is responsive to a write request related to a data element being received at the storage system for implementing a provisional redundant storage sequence including: storing the data element within the PS space and substantially immediately or concurrently storing recovery-enabling-data corresponding to the data-element within the TBS space. The controller is configured to acknowledge the write request substantially immediately following completion of the storage within the PS space and within the TBS space, and the provisional redundant storage sequence is thus complete. The one or more UPS units are configured to provide backup power to extend data-retention on some or all of the VS devices in case of power interruption. Asynchronously with the provisional redundant storage sequence, the controller is configured to destage the recovery-enabling-data to the PBS space.

The controller of the storage system proposed in U.S. Provisional Application Ser. No. 61/193,079 and in the corresponding PCT application No. IL2009/001005 filed Oct. 27, 2009 may be configured to manage the asynchronous destaging of the recovery enabling data in accordance with a predefined permanent backup deferral policy which takes into account at least one parameter that is independent of the provisional redundant storage sequence of the respective data element. The deferral policy may provide a controlled timeframe for deferring the asynchronous destaging of the recovery enabling data relative to the storage system's response to the respective write request (the storage system response may be any one of the operations which are part of the provisional redundant storage sequence). The deferral policy may take into account the capacity of the UPS units. The deferral policy may further take into account the availability of storage resources within the TBS space. The deferral policy may take into account at least one other process running within the storage system and competing for resources with the data destaging process.

During normal operation (not power interruption) the UPS units are configured to provide backup power for at least the time-duration required for completing the destaging of data from the TBS space (which is based on VS devices) to the PBS space (which is based on NVS devices), so that the entire data-set of the storage system is backed up on NVS devices before the storage system can gracefully shutdown.

Further as part of the storage system proposed in U.S. Provisional Application Ser. No. 61/193,079 and in the corresponding PCT application No. IL2009/001005 filed Oct. 27, 2009 the controller may be responsive to an indication that the recovery-enabling-data was successfully destaged to the PBS space for releasing the TBS space resources that were used for storing the corresponding recovery-enabling-data. Once released, the storage resources of the TBS space can be used for storing other data, such as recovery-enabling-data corresponding to a data element that is associated with a more recent write command.

The storage capacity of the TBS space is substantially smaller than the storage capacity of the PS space. The storage capacity of the PBS space is substantially equal to (or larger than) the storage capacity of the PS space. At any time during the operation of the storage system, the data stored within the PS space is protected by corresponding recovery-enabling-data that is stored within the TBS space or within the PS space. During normal operation (not power interruption), a relatively small portion of the data within the PS space is protected by data within the TBS space, and the PBS space protects at least the remaining data which is not protected by the data within the TBS space.

As is well known, and as was mentioned above, the ability of a volatile data-retention unit to retain data is sensitive to main power interruption. It is therefore common to regard volatile data retention devices as "memory devices" and not as "storage devices". However, it would be apparent to those versed in the art that within the storage system proposed in U.S. Provisional Application Ser. No. 61/193,079 and in the corresponding PCT application No. IL2009/001005 filed Oct. 27, 2009, and described above, utilizes the primary storage space which is associated with volatile data-retention devices (or "volatile storage devices") in combination with other components and logic for substantially persistently storing data therein. Specifically, the proposed storage system further includes: two complementary backup storage spaces: a temporary backup storage layer (or space) which is also associated with VS devices; and a permanent backup storage layer which is associated with NVS devices, a storage controller and one or more UPS units for providing backup power to enable full backup in case of power interruption and graceful shut-down, and a recovery controller for recovering the data into the primary storage space following data loss within the primary storage space.

The VS devices associated with the PS space are regarded herein as storage devices, despite their inherent volatility, since the logical storage addresses that are used by the storage system for servicing I/O requests from external sources are associated with physical storage locations on VS devices, and this configuration is restored in case of power interruption before normal operation of the storage system is resumed. It would be appreciated that this sort of behavior is characteristic of storage devices.

During normal operation of the storage system, I/O requests from external sources (which typically reference logical storage addresses) are mapped to physical storage locations allocated for the PS space by the VS devices associated with the PS space. In case of failure within the PS space, the entire data-set is protected, as explained above, and can be recovered from the PBS layer or from the TBS layer. In case of severe power interruption, the entire data-set of the storage system is stored within the NVS devices underlying the PBS layer, and once normal power is restored the data that was lost is recovered into the PS space and normal I/O operations are resumed vis-à-vis the VS devices associated with the PS space.

From a user's (host) perspective, the data protection and the data availability capabilities of the storage system are similar to the protection and availability provided by many commercially available non-volatile storage systems, such as hard-drive disk ("HDD") based storage systems (including various RAID implementations), or in another example, such as non-volatile solid-state disk ("SSD") flash based storage systems. For example, when a read command is received at the storage system proposed in U.S. Provisional Application Ser. No. 61/193,079 and in the corresponding PCT application No. IL2009/001005 filed Oct. 27, 2009, say from a host, the storage system controller reads the logical storage address referenced by the read command and determines the corresponding physical storage location(s) associated with the referenced logical storage address. The physical storage location(s) point towards specific locations within one or more of the first plurality of VS devices associated with the PS space. The storage system controller reads the data stored on the VS device(s) at the physical storage location(s) determined to be associated with the read command and communicates the data back to the host.

Figure 6:
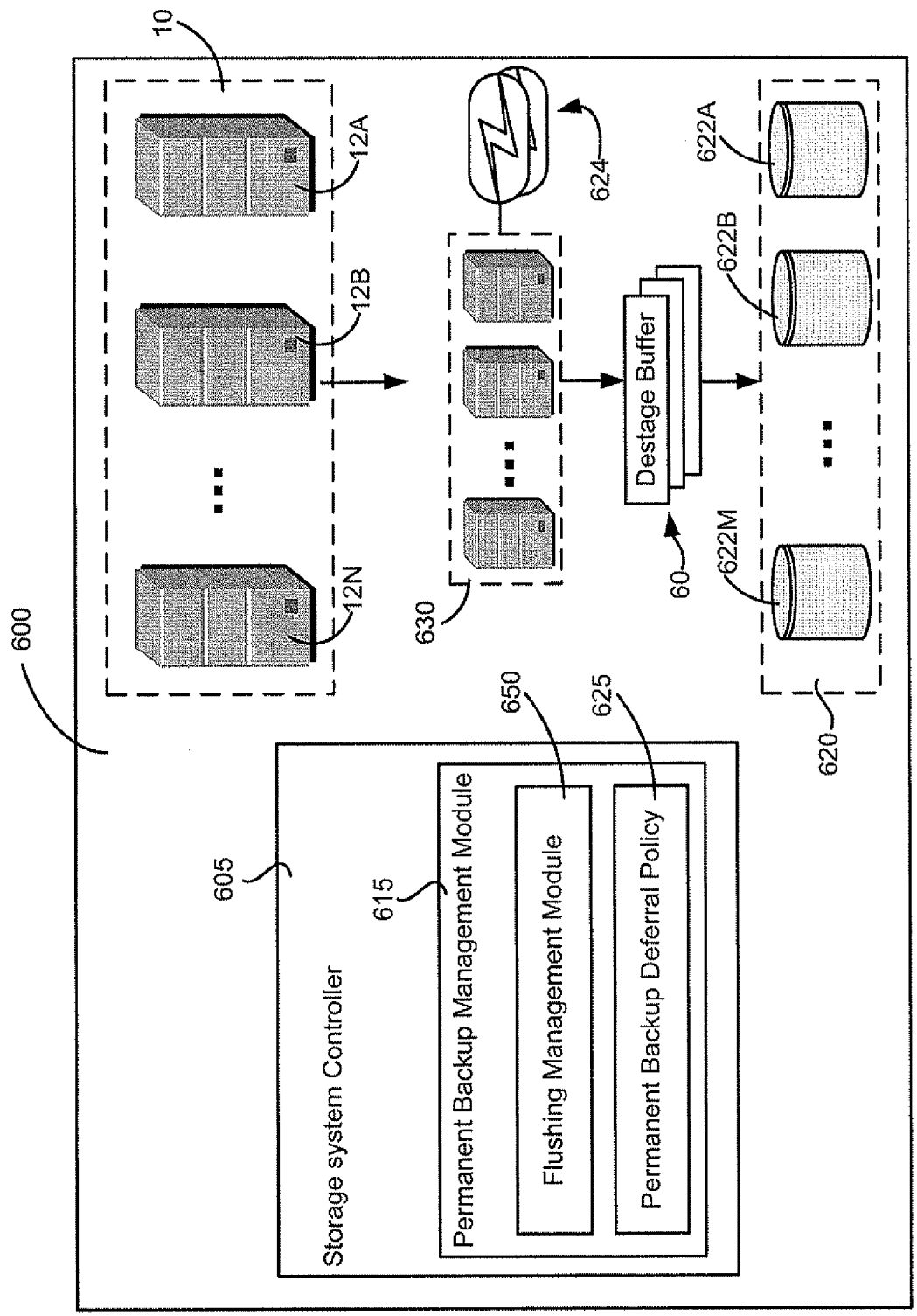
FIG. 6 is a block diagram illustration of another example of a hierarchical storage system including a flushing module, according to some embodiments of the present invention.

Reference is now made to FIG. 6, which is a block diagram illustration of another example of a hierarchical storage system including a flushing module, according to some embodiments of the present invention. The hierarchical storage system 600 shown in FIG. 6 is generally based upon the storage system disclosed in proposed in U.S. Provisional Application Ser. No. 61/193,079 and in the corresponding PCT application No. IL2009/001005 filed Oct. 27, 2009 and described above.

According to some embodiments of the present invention, the storage system controller 605 may incorporate or be associated with the flushing management module 650 described above. For example, the flushing management procedure described above may be integrated with the permanent backup deferral policy, and a permanent backup management module 615 implemented as part of the storage system controller 605 may incorporate both the flushing management module 650 and a permanent backup deferral policy module 625.

According to some embodiments, the flushing management module 650 may be configured to scan the TBS 630 to identify groups of dirty data blocks which are comprised of dirty data blocks arranged in sequence within the PBS 620. The flushing management module 650 may further scan the TBS 630 for any group(s) of backed-up data blocks and/or of empty data blocks which form an intermediary sequence within the PBS 620 in-between the sequences formed by identified groups of dirty data blocks.

According to some embodiments, in case the flushing management module 650 identifies one or more backed-up data blocks which form or are part of an intermediary sequence within the PBS space 620 in-between the sequences formed by identified groups of dirty data blocks, the flushing management module 650 may retrieve the identified backed up data block(s). Since the TBS space 630 stores only a relatively small portion of the data-set of the storage system 600, and data which has been successfully destaged to the PBS space 620 is typically overwritten with new or newly modified data, the flushing management module 650 may retrieve the backed-up data from the PS 10 and may add the retrieved backed-up data block(s) to a flushing sequence in the appropriate location. Since the PS 10 holds the entire data-set of the storage system 600, the backed-up data blocks are available within the PS 10, and thanks to the high RA performance of the PS, the retrieval of the backed-up blocks does not impose a significant latency.

The flush buffer 60 also provides good performance in RA, and so the backed-up data can be added to the flush sequence in the appropriate positions without imposing significant latency. For the same reason, adding padding data, where empty data is identified also does not impose a significant penalty.

In addition, in case the PBS 620 implements a data protection scheme which involves calculation of parity or a similar procedure which involves further data in addition to the modified block (the dirty data block), and the PS 10 has a different protection scheme (or none), the flushing management module 650 may identify parity blocks or parity sequences of blocks (or any other protection data) which are intermediate in-between the identified groups of dirty data blocks the PBS 620. In some embodiments, the PBS 620 does not include the parity data, since it does not implement a protection scheme that is used to protect the data within the PBS 620. The PS 10 also does not include the parity data, since it does not implement the protection scheme that is used to protect the data within the PBS 620. However, the PS 10 holds the entire data-set of the storage system 600, and any protection data that is calculated based on data that is stored within the storage system 600 can be calculated from the data available within the PS 10, in particular the data blocks which are associated with a specific parity data block (or sequence of blocks). Furthermore, since the PS 10 provides good performance in RA, the flushing management module 50 can retrieve the blocks which are associated with a certain parity data block (or sequence) from the PS 10 without imposing significant latency. Once retrieved, the parity data can be calculated and it can be added to a flush sequence in-between groups (or individual) of dirty data blocks, groups of backed-up data blocks and/or of "empty" data blocks to form a single, combined flush sequence which can be flushed to the PBS 620 and written thereon as a single sequential write.

In some embodiments, as mentioned above, the flushing management procedure may be integrated with the permanent backup deferral policy, and a permanent backup management module 615 implemented as part of the storage system controller 605 may incorporate both the flushing management module 650 and a permanent backup deferral policy module 625. For example, the flushing management module 650 may form multiple flush sequences and may rank the flush sequences for determining the order by which the sequences are to be flushed to the PBS 620. The permanent backup deferral policy module 625 may implement the permanent backup deferral policy to determine the actual initiation of the destaging of the flush sequence(s) at the top of the destaging queue, according to the deferral criteria included in the permanent backup deferral policy.

There is now provided, by way of example, a description of certain aspects of a deferral policy which may be implemented within the hierarchical storage system 600. In some embodiments, in accordance with the deferral policy, the writing of dirty data to the PBS space 620 is deferred relative to the writing of the respective new or newly modified data within the PS 10. In further embodiments, the deferral of the backup within the PBS space 620 is not synchronous with the storage of the new or newly modified data within the PS 10. In further embodiments, the permanent backup deferral policy may set forth a controlled timeframe for suspending the writing of data to the PBS space 620 relative to the storage of the corresponding data within the PS 10.

In some embodiments, the point of reference that is used by the deferral policy for measuring a deferral interval for any given data may relate to any one of the events related to the provisional redundant storage sequence mentioned above. In further embodiments, the deferral policy may take into account at least one parameter that is independent of the provisional redundant storage sequence.

In some embodiments, the deferral policy may be configured to take into account the capacity or the UPS units 624. The deferral policy may further take into account the availability of storage resource within the TBS space 630. In another example, the deferral policy may take into account the size of the flush sequence, the amount of dirty data within the flush sequence and/or the density of dirty data within the flush sequence. In yet further embodiments, the deferral policy may take into account the age of the flush sequence or the age of the dirty data associated with the flush sequence.

In still further embodiments, the scanning procedure which is part of the flushing procedure is carried out with respect to one chunk at a time, as was discussed in detail below. The criteria related to the size of the flush sequence, the amount of dirty data within the flush sequence, the density of dirty data within the flush sequence and the age of the flush sequence or the age of the dirty data associated with the flush sequence may all relate to the different flush sequences selected for each of the different chunks.

According to some embodiments, the deferral policy may include a priority rule, function and/or criterion for promoting the destaging of a pending flush sequence to the PBS space 620 with time. Thus, all other things being equal, priority of a pending flush sequence may increase with time.

In still further embodiments, the deferral policy may take into account at least one other process running within the storage system 600. For example, in some embodiments, according to the deferral policy, a flush sequence may be deferred, for example, to allow completion of a priority operation or a priority sequence that is concurrently pending or that is concurrently taking place within the storage system 600. According to some embodiments, while the flush sequence is pending, its own priority may be adjusted (promoted) and thus it may itself become a high-priority operation relative to other operations within the storage system 600. It would be appreciated that other measures may be implemented to control the amount of time a certain flush sequence or the flushing procedure as a whole is delayed. In further embodiments, the time duration during which a certain flush sequence is delayed is not taken into account by the deferral policy and some pending flush sequences may be deferred for relatively long, and possibly unlimited, time duration.

There is now provided a discussion of some examples of possible implementation of a deferral policy which may be implemented by the storage system 600 according to some embodiments of the present invention.

According to some embodiments, the permanent backup deferral policy module 625 may manage a queue of pending flush sequences that are waiting to be written to the PBS space 620, and the management of the queue may be associated with the (current) capacity of the UPS units 624. Various queue management techniques are known per se and may be implemented in some embodiments of the present invention. The deferral policy may control the size of the queue and may manage it according to the capacity of the UPS units 624, so that in case of power interruption the backup power is sufficient to destaged all the dirty data in the storage system 600, and in particular all the pending flush sequences, to the PBS space 620 and to store the backup data within the non-volatile data-retention units 622A-622M underlying the PBS space 620. The total amount of dirty data and/or the total amount of data associated with the pending flush sequences in the system 600 may be used to calculate the amount of power required to fully backup the PS 10 within the PBS space 620.

In some embodiments, the deferral policy may include several progressive thresholds, the progressive thresholds associated with respective progressively increasing queue sizes. In association with each one of the progressive thresholds, the deferral policy may include a priority parameter, so that the larger the size of the queue, the higher the priority that is given to pending flush sequences at the top of the queue. This measure and possibly other measures included in the deferral policy may be used to ensure that the size of the pending flush sequences queue does not grow beyond that which can be supported by the available backup power. In some embodiments, in case the amount of available backup power changes, the deferral policy is manually or automatically updated accordingly.

In further embodiments, the size of the TBS space 630 is determined according to the capacity of UPS units 624, or according to the amount of available backup power. For example, the TBS space 630 is such that the size of the available backup power is sufficient to enable to complete the destaging of the entire TBS space 630 and to complete storage of data which corresponds to the entire TBS space 630 within the PBS space 620. In still further embodiments, the TBS space 630 is such that the size of the available backup power is sufficient to enable to complete the destaging of a redefined portion of the TBS space 630 and to complete storage of data which corresponds to that portion of the TBS space 630 within the PBS space 620.

In some embodiments, the flush sequence procedure may also be taken into account for determining the size of the TBS space 630 or the amount of backup power that is required. In this regard the scanning for groups of dirty data and backed-up data, the scanning for blocks within the PS space 10 that are part of a certain parity set, the writing of the flush sequences to the flush buffers 60, the writing of the flush sequences to the PBS space 620 may all be taken into account when the size of the TBS space 630 or the amount of backup power that is required.

In such embodiments, the deferral policy may relate to the amount of TBS space 630 that can used for storing backup data and may promote issuance of write commands to the PBS space 620 as temporary backup storage resources are approaching (e.g., to various degrees) depletion.

In some embodiments, the permanent backup deferral policy may take into account the duration since the dirty data associated with a certain flush sequence was least accessed, e.g., priority is given to destaging flush sequences which are associated with a dirty data which has been accessed the smallest number of times during a certain period of time. In another example, according to the deferral policy, priority is given to flush sequences which are associated with dirty data which was least recently accessed or modified (the oldest data). Access frequency and/or most recent access times may be used by the deferral policy as indication of likelihood that the dirty data will be accessed or modified again soon. By anticipating (with at least partial success) rewrites on certain dirty data, it may be possible to reduce the number of writes to the PBS space 620, and to improve utilization of the TBS space 630 and overall performance of the storage system 600.

In a further example of a possible deferral policy, the deferral policy may take into account services or processes within the storage system 600 or associated with the storage system 600. In some embodiments, the deferral policy may take into account services or processes which compete for system resource with the destaging process. By way of example, the deferral policy may include a predefined system optimization criterion. The system optimization criterion may relate to at least one resource of the mass-storage system 600 and may prescribe an optimization scheme, an optimization threshold or an optimization function with respect to the system resource(s). According to the deferral policy, and based upon the predefined system optimization criterion, the writing of a flush sequence to the PBS space 620 may be deferred for a certain period of time following the system's 600 response from the corresponding incoming write command.

In some embodiments, the optimization criterion may relate to one or more system parameters which are associated with the current, past, projected or assumed (e.g., based on statistical data) operation of the system 600 or any of its components, performance of the system 600 or any of its components, capacity of the system 600 or any of its components, priority of a process or services running or pending in the system 600, the redundancy of the system 600 or of any of its components. The optimization criterion may also relate to the state of the pending flush sequences to the PBS space 620, including for example, the number of pending flush sequences in the queue, the aggregate size of pending flush sequences in the queue, the average amount or mean pendency time of pending flush sequences in the queue, the highest pendency time of pending flush sequences in the queue, the lowest pendency time of pending flush sequences in the queue, the utilization level of the TBS space 630, the current, past or projected incoming I/Os (instantaneous or average) rate, etc. The above parameters are provided by way of example only and are non-limiting. Furthermore, the use of the above parameters is not limited to the system optimization based deferral policy and may be used as part of other implementations of the deferral policy described herein.

The system optimization criterion may allow optimization of the system's resource(s) while maintaining a controlled lag between the storage system's 600 response to the corresponding incoming write commands and the issuance of the flush sequences write command to the PBS space 620.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

NUMBERED EMBODIMENTS

1. A storage system, comprising:
   a primary storage entity utilized for storing a data-set of the storage system;
   a secondary storage entity utilized for backing-up the data within the primary storage entity;
   a flushing management module adapted to identify within the primary storage entity two groups of dirty data blocks, each group is comprised of dirty data blocks which are arranged within the secondary storage entity in a successive sequence, and to further identify within the primary storage entity a further group of backed-up data blocks which are arranged within the secondary storage entity in a successive sequence intermediately in-between the two identified groups of dirty data blocks; and
   said flushing management module is adapted to combine the group of backed-up data blocks together with the two identified groups of dirty data blocks to form a successive extended flush sequence and to destage it to the secondary storage entity.
2. The system according to numbered embodiment 1, wherein said flushing management module is adapted to write the extended flush sequence on said secondary storage entity as a single successive write stream.
3. The system according to numbered embodiment 1, wherein the backing-up of data within the secondary storage entity is asynchronous with the storage of the corresponding data within the primary storage entity.
4. The system according to numbered embodiment 1, wherein within said secondary storage entity, said two identified groups of dirty-data blocks are fragmented relative to one another by the backed-up data blocks in the group of backed-up data blocks.
5. The system according to numbered embodiment 1, wherein said flushing management module is adapted to identify one or more empty data blocks which are arranged within the secondary storage entity in a successive sequence in-between the two identified groups of dirty data blocks, and wherein the successive intermediate sequence in-between the two identified groups of dirty data blocks is formed by a combination of one the one or more dirty data blocks and one or more empty data blocks.
6. The system according to numbered embodiment 1, wherein said flushing management module is adapted to identify a plurality of groups of dirty data blocks pairs, each dirty data blocks group is comprised of dirty data blocks which are arranged within the secondary storage entity in a successive sequence, and for each pair of dirty data blocks groups, to further identify a group of backed-up data blocks which are arranged within the secondary storage entity in a successive sequence intermediately in-between the respective pair of, and wherein said flushing management module is adapted to combine some or all of the identified groups of dirty data blocks and some or all of the identified of backed-up data blocks to form a successive extended flush sequence within said secondary storage entity.
7. The system according to numbered embodiment 6, wherein said flushing management module is adapted to combine said some or all of the identified groups of dirty data blocks and said some or all of the identified groups of backed-up data blocks to form a successive extended flush sequence and to destage it to the secondary storage entity.
8. The system according to any one of numbered embodiments 1, 5 or 7, wherein said flushing management module is adapted to rank a destage priority of the extended flush sequence relative to other pending flush sequences according to a size of the extended flush sequence and according to a density of dirty data blocks within the flush sequence.
9. The system according to numbered embodiment 1, wherein said flushing management module is configured to search the primary storage tier for flush sequences one chunk at a time and to thereby identify with respect to one or more chunks at least one successive extended flush sequence.
10. The system according to numbered embodiment 9, wherein for each chunk, said flushing management module is adapted to scan said primary storage entity for groups of dirty data blocks forming a successive sequence within the current chunk of the secondary storage entity.
11. The system according to numbered embodiment 10, wherein for each chunk, said flushing management module is adapted to scan said primary storage entity for at least one group of backed-up data blocks which forms within the current chunk of the secondary storage entity an intermediary successive sequence in-between at least two identified groups of dirty data blocks.
12. The system according to numbered embodiment 11, wherein said flushing management module is adapted to combine two of the identified groups of dirty data blocks within a current chunk with a group of backed-up data blocks which forms within the secondary storage entity an intermediary successive sequence in-between the two identified groups of dirty data blocks to form a single extended successive flush sequence.

13. The system according to numbered embodiment 12, wherein said flushing management module is adapted to identify a plurality of pairs of dirty data blocks groups, each dirty data blocks group is comprised of dirty data blocks which are arranged within a current chunk of the secondary storage entity in a successive sequence, and for each pair of dirty data blocks groups, to further identify a group of backed-up data blocks which are arranged within the secondary storage entity in a successive sequence intermediately in-between the respective groups pair, and wherein said flushing management module is adapted to combine some or all of the identified groups of dirty data blocks and some or all of the identified of backed-up data blocks to form a successive extended flush sequence within the current chunk.

14. The system according to any one of numbered embodiments 12 or 13, wherein said flushing management module is adapted to rank a chunk according to a density of dirty data blocks within a flush sequence formed by blocks within the respective chunk and according to a size of the flush sequence.

15. The system according to numbered embodiment 14, wherein each chunk is associated with a timestamp corresponding to a most recent destaging of a flush sequence within that chunk, and wherein a rank of a flushing sequence is influenced by a respective chunk's timestamp.

16. The system according to numbered embodiment 14, wherein said flushing management module is adapted to identify a largest flush sequence for the current chunk and is further adapted to rank each chunk according to its largest flush sequence.

17. The system according to numbered embodiment 1, wherein said flushing management module is adapted to set forth a minimal and/or a maximal group size for one or more of the following:
   a group of dirty-data blocks which are arranged within the secondary storage entity in a successive sequence;
   a group of backed-up data blocks which are arranged within the secondary storage entity in a successive sequence intermediately in-between two identified groups of dirty data blocks;
   a group of backed-up and/or empty data blocks which are collectively arranged within the secondary storage entity in a successive sequence intermediately in-between two identified groups of dirty data blocks; and
   a group of blocks constituting a flush sequence.

18. The system according to any one of numbered embodiments 1 or 9, wherein said secondary storage entity implements a parity protection scheme, and wherein said flushing management module is adapted to identify one or more parity data blocks which are arranged within the secondary storage entity in a successive sequence in-between the two identified groups of dirty data blocks, and the successive intermediate sequence in-between the two identified groups of dirty data blocks is formed by a combination of the one or more parity blocks and one or more dirty data blocks and/or one or more empty data blocks.

19. The system according to numbered embodiment 1, wherein during normal operation of the system, the secondary storage tier is dedicated for handling incoming writes only.

20. The system according to numbered embodiment 1, wherein said primary storage entity is characterized by relatively high performance, in particular in random access, whereas the secondary storage tier is characterized by relatively slower performance at least in random access or when performing relatively small write operations.

21. The system according to any one of numbered embodiments 1 or 20, wherein said primary storage entity is comprised primarily of solid state data-retention units that are utilized for persistently storing the entire data-set of the storage system and said secondary storage entity is comprised primarily of non-solid-state data retention units.

22. The system according to any one of the numbered embodiments 1, 20 or 21, wherein said primary storage entity is comprised primarily of volatile data-retention units that are utilized for persistently storing the entire data-set of the storage system and said secondary storage entity is comprised primarily of nonvolatile data retention units.

23. A method of managing a storage system, comprising:
   identifying within a primary storage entity two groups of dirty data blocks, each group is comprised of dirty data blocks which are arranged within a secondary storage entity in a successive sequence, and to further identify within the primary storage entity a further group of backed-up data blocks which are arranged within the secondary storage entity in a successive sequence intermediately in-between the two identified groups of dirty data blocks; and
   combining the group of backed-up data blocks together with the two identified groups of dirty data blocks to form a successive extended flush sequence and to destage it to the secondary storage entity.

24. The method according to numbered embodiment 23, wherein the primary storage entity is used for storing a data-set of the storage system, and the secondary storage entity is utilized for backing-up the data within the primary storage entity.

25. The method according to numbered embodiment 23, further comprising writing the extended flush sequence on the secondary storage entity as a single successive write stream.

26. The method according to numbered embodiment 23, said writing the extended flush sequence on the secondary storage entity is asynchronous with the storage of the corresponding data within the primary storage entity.

27. The method according to numbered embodiment 23, wherein the two identified groups of dirty-data blocks are fragmented relative to one another by the backed-up data blocks in the group of backed-up data blocks.

28. The method according to numbered embodiment 23, wherein said identifying further comprises, identifying one or more empty data blocks which are arranged within the secondary storage entity in a successive sequence in-between the two identified groups of dirty data blocks, and wherein the successive intermediate sequence in-between the two identified groups of dirty data blocks is formed by a combination of one or more dirty data blocks and one or more empty data blocks.

29. The method according to numbered embodiment 23, wherein said identifying further comprises identifying a plurality of groups of dirty data blocks pairs, each dirty data blocks group is comprised of dirty data blocks which are arranged within the secondary storage entity in a successive sequence, and for each pair of dirty data blocks groups, to further identify a group of backed-up data blocks which are arranged within the secondary storage entity in a successive sequence intermediately in-between the respective pair of, and wherein said combining comprises combining some or all of the identified groups of dirty data blocks and some or all of the identified of backed-up data blocks to form a successive extended sequence within said secondary storage entity.

30. The method according to any one of numbered embodiments 23, 28 or 29, further comprising ranking a destage priority of the extended flush sequence relative to other pending flush sequences according to a size of the extended flush sequence and according to a density of dirty data blocks within the flush sequence.

31. The method according to numbered embodiment 23, wherein said identifying is implemented one chunk at a time.

32. The method according to numbered embodiment 31, wherein for each chunk, said identifying includes scanning the primary storage entity for groups of dirty data blocks forming a successive sequence within the current chunk of the secondary storage entity.

33. The method according to numbered embodiment 31, wherein for each chunk, said scanning includes scanning the primary storage entity for at least one group of backed-up data blocks which forms within the current chunk of the secondary storage entity an intermediary successive sequence in-between at least two identified groups of dirty data blocks.

34. The method according to numbered embodiment 33, wherein said combining includes combining two of the identified groups of dirty data blocks within a current chunk with a group of backed-up data blocks which forms within the secondary storage entity an intermediary successive sequence in-between the two identified groups of dirty data blocks to form a single extended successive flush sequence.

35. The method according to numbered embodiment 33, wherein said identifying includes identify a plurality of pairs of dirty data blocks groups, each dirty data blocks group is comprised of dirty data blocks which are arranged within a current chunk of the secondary storage entity in a successive sequence, and for each pair of dirty data blocks groups, identifying a group of backed-up data blocks which are arranged within the secondary storage entity in a successive sequence intermediately in-between the respective groups pair, and wherein said combining comprises combining some or all of the identified groups of dirty data blocks and some or all of the identified of backed-up data blocks to form a successive extended flush sequence within the current chunk.

36. The method according to any one of numbered embodiments 34 or 35, further comprising ranking a chunk according to a density of dirty data blocks within a flush sequence formed by blocks within the respective chunk and according to a size of the flush sequence.

37. The method according to numbered embodiment 36, wherein said ranking a chunk further comprises reading a timestamp corresponding to a most recent destaging of a flush sequence within that chunk, and adapting a rank of the chunk according to the chunk's timestamp.

38. The method according to numbered embodiment 36, wherein said ranking comprises identifying a largest flush sequence for the current chunk and ranking each chunk according to its largest flush sequence.

39. The method according to numbered embodiment 23, wherein said identifying comprises implementing a minimal and/or a maximal group size for one or more of the following:

a group of dirty-data blocks which are arranged within the secondary storage entity in a successive sequence;

a group of backed-up data blocks which are arranged within the secondary storage entity in a successive sequence intermediately in-between two identified groups of dirty data blocks;

a group of backed-up and/or empty data blocks which are collectively arranged within the secondary storage entity in a successive sequence intermediately in-between two identified groups of dirty data blocks; and a group of blocks constituting a flush sequence.

40. The method according to any one of numbered embodiments 23 or 31, wherein said secondary storage entity implements a parity protection scheme, and wherein said identifying comprises identifying one or more parity data blocks which are arranged within the secondary storage entity in a successive sequence in-between the two identified groups of dirty data blocks, and the successive intermediate sequence in-between the two identified groups of dirty data blocks is formed by a combination of the one or more parity blocks and one or more dirty data blocks with or without one or more empty data blocks.

41. The method according to numbered embodiment 23, wherein during normal operation of the system, the secondary storage tier is dedicated for handling incoming writes only.

42. The method according to numbered embodiment 23, wherein the primary storage entity is characterized by relatively high performance, in particular in random access, whereas the secondary storage tier is characterized by relatively slower performance at least in random access or when performing relatively small write operations.

43. The method according to any one of numbered embodiments 23 or 42, wherein the primary storage entity is comprised primarily of solid state data-retention units that are utilized for persistently storing the entire data-set of the storage system and the secondary storage entity is comprised primarily of non-solid-state data retention units.

44. The method according to any one of the numbered embodiments 23, 42 or 43, wherein the primary storage entity is comprised primarily of volatile data-retention units that are utilized for persistently storing the entire data-set of the storage system and the secondary storage entity is comprised primarily of nonvolatile data retention units.

45. A program storage device readable by machine, tangibly embodying a program of instructions executable by the machine to perform a method of managing a storage system, comprising:

identifying within a primary storage entity two groups of dirty data blocks, each group is comprised of dirty data blocks which are arranged within a secondary storage entity in a successive sequence, and to further identify within the primary storage entity a further group of backed-up data blocks which are arranged within the secondary storage entity in a successive sequence intermediately in-between the two identified groups of dirty data blocks; and combining the group of backed-up data blocks together with the two identified groups of dirty data blocks to form a successive extended flush sequence and to destage it to the secondary storage entity.

46. A computer program product comprising a computer usable medium having computer readable program code embodied therein of managing a storage system, the computer program product comprising:

computer readable program code for causing the computer to identify within a primary storage entity two groups of dirty data blocks, each group is comprised of dirty data blocks which are arranged within a secondary storage entity in a successive sequence, and to further identify within the primary storage entity a further group of backed-up data blocks which are arranged within the secondary storage entity in a successive sequence intermediately in-between the two identified groups of dirty data blocks; and computer readable program code for causing the computer to combine the group of backed-up data blocks together with the two identified groups of dirty data blocks to form a successive extended flush sequence and to destage it to the secondary storage entity.

What is claimed is:

1. A storage system, comprising:
a primary storage entity utilized for storing a data-set of the storage system;
a secondary storage entity utilized for backing-up the data within the primary storage entity;
a flushing management module adapted to select from the primary storage entity groups of data blocks to be destaged to the secondary storage entity;
the selection comprising:
identifying within the primary storage entity two groups of dirty data blocks, each group is comprised of dirty data blocks which are arranged within the secondary storage entity in a successive sequence; identifying within the primary storage entity a further group of backed-up data blocks which are arranged within the secondary storage entity in a successive sequence intermediately in-between the two identified groups of dirty data blocks; and
said flushing management module is adapted to combine the group of backed-up data blocks together with the two identified groups of dirty data blocks to form a successive extended flush sequence and to destage it to the secondary storage entity.

2. The system according to claim 1, wherein said flushing management module is adapted to write the extended flush sequence on said secondary storage entity as a single successive write stream.

3. The system according to claim 1, wherein the backing-up of data within the secondary storage entity is asynchronous with the storage of the corresponding data within the primary storage entity.

4. The system according to claim 1, wherein within said secondary storage entity, said two identified groups of dirty-data blocks are fragmented relative to one another by the backed-up data blocks in the group of backed-up data blocks.

5. The system according to claim 1, wherein said flushing management module is adapted to identify one or more empty data blocks which are arranged within the secondary storage entity in a successive sequence in-between the two identified groups of dirty data blocks, and wherein the successive intermediate sequence in-between the two identified groups of dirty data blocks is formed by a combination of one the one or more dirty data blocks and one or more empty data blocks.

6. The system according to claim 1, wherein said flushing management module is adapted to identify a plurality of groups of dirty data blocks pairs, each dirty data blocks group is comprised of dirty data blocks which are arranged within the secondary storage entity in a successive sequence, and for each pair of dirty data blocks groups, to further identify a group of backed-up data blocks which are arranged within the secondary storage entity in a successive sequence intermediately in-between the respective pair of, and wherein said flushing management module is adapted to combine some or all of the identified groups of dirty data blocks and some or all of the identified of backed-up data blocks to form a successive extended flush sequence within said secondary storage entity.

7. The system according to claim 6, wherein said flushing management module is adapted to combine said some or all of the identified groups of dirty data blocks and said some or all of the identified groups of backed-up data blocks to form a successive extended flush sequence and to destage it to the secondary storage entity.

8. The system according to claim 1, wherein said flushing management module is adapted to rank a destage priority of the extended flush sequence relative to other pending flush sequences according to a size of the extended flush sequence and according to a density of dirty data blocks within the flush sequence.

9. The system according to claim 1, wherein said flushing management module is configured to search the primary storage tier for flush sequences one chunk at a time and to thereby identify with respect to one or more chunks at least one successive extended flush sequence.

10. The system according to claim 9, wherein for each chunk, said flushing management module is adapted to scan said primary storage entity for groups of dirty data blocks forming a successive sequence within the current chunk of the secondary storage entity.

11. The system according to claim 10, wherein for each chunk, said flushing management module is adapted to scan said primary storage entity for at least one group of backed-up data blocks which forms within the current chunk of the secondary storage entity an intermediary successive sequence in-between at least two identified groups of dirty data blocks.

12. The system according to claim 11, wherein said flushing management module is adapted to combine two of the identified groups of dirty data blocks within a current chunk with a group of backed-up data blocks which forms within the secondary storage entity an intermediary successive sequence in-between the two identified groups of dirty data blocks to form a single extended successive flush sequence.

13. The system according to claim 12, wherein said flushing management module is adapted to identify a plurality of pairs of dirty data blocks groups, each dirty data blocks group is comprised of dirty data blocks which are arranged within a current chunk of the secondary storage entity in a successive sequence, and for each pair of dirty data blocks groups, to further identify a group of backed-up data blocks which are arranged within the secondary storage entity in a successive sequence intermediately in-between the respective groups pair, and wherein said flushing management module is adapted to combine some or all of the identified groups of dirty data blocks and some or all of the identified of backed-up data blocks to form a successive extended flush sequence within the current chunk.

14. The system according to claim 12, wherein said flushing management module is adapted to rank a chunk according to a density of dirty data blocks within a flush sequence formed by blocks within the respective chunk and according to a size of the flush sequence.

15. The system according to claim 14, wherein each chunk is associated with a timestamp corresponding to a most recent destaging of a flush sequence within that chunk, and wherein a rank of a flushing sequence is influenced by a respective chunk's timestamp.

16. The system according to claim 14, wherein said flushing management module is adapted to identify a largest flush sequence for the current chunk and is further adapted to rank each chunk according to its largest flush sequence.

17. The system according to claim 1, wherein said flushing management module is adapted to set forth a minimal and/or a maximal group size for one or more of the following:
- a group of dirty-data blocks which are arranged within the secondary storage entity in a successive sequence;
- a group of backed-up data blocks which are arranged within the secondary storage entity in a successive sequence intermediately in-between two identified groups of dirty data blocks;
- a group of backed-up and/or empty data blocks which are collectively arranged within the secondary storage entity in a successive sequence intermediately in-between two identified groups of dirty data blocks; and
- a group of blocks constituting a flush sequence.

18. The system according to claim 1, wherein said secondary storage entity implements a parity protection scheme, and wherein said flushing management module is adapted to identify one or more parity data blocks which are arranged within the secondary storage entity in a successive sequence in-between the two identified groups of dirty data blocks, and the successive intermediate sequence in-between the two identified groups of dirty data blocks is formed by a combination of the one or more parity blocks and one or more dirty data blocks and/or one or more empty data blocks.

19. The system according to claim 1, wherein during normal operation of the system, the secondary storage tier is dedicated for handling incoming writes only.

20. The system according to claim 1, wherein said primary storage entity is characterized by relatively high performance, in particular in random access, whereas the secondary storage tier is characterized by relatively slower performance at least in random access or when performing relatively small write operations.

21. The system according to claim 1, wherein said primary storage entity is comprised primarily of solid state data-retention units that are utilized for persistently storing the entire data-set of the storage system and said secondary storage entity is comprised primarily of non-solid-state data retention units.

22. The system according to claim 1, wherein said primary storage entity is comprised primarily of volatile data-retention units that are utilized for persistently storing the entire data-set of the storage system and said secondary storage entity is comprised primarily of nonvolatile data retention units.

23. A method of managing a storage system, comprising:
selecting from primary storage entity groups of data blocks to be destaged to a secondary storage entity, the selection comprising:
identifying within a primary storage entity two groups of dirty data blocks, each group is comprised of dirty data blocks which are arranged within a secondary storage entity in a successive sequence; identifying within the primary storage entity a further group of backed-up data blocks which are arranged within the secondary storage entity in a successive sequence intermediately in-between the two identified groups of dirty data blocks; and
combining the group of backed-up data blocks together with the two identified groups of dirty data blocks to form a successive extended flush sequence and to destage it to the secondary storage entity.

24. The method according to claim 23, wherein the primary storage entity is used for storing a data-set of the storage system, and the secondary storage entity is utilized for backing-up the data within the primary storage entity.

25. The method according to claim 23, further comprising writing the extended flush sequence on the secondary storage entity as a single successive write stream.

26. The method according to claim 23, said writing the extended flush sequence on the secondary storage entity is asynchronous with the storage of the corresponding data within the primary storage entity.

27. The method according to claim 23, wherein the two identified groups of dirty-data blocks are fragmented relative to one another by the backed-up data blocks in the group of backed-up data blocks.

28. The method according to claim 23, wherein said identifying further comprises, identifying one or more empty data blocks which are arranged within the secondary storage entity in a successive sequence in-between the two identified groups of dirty data blocks, and wherein the successive intermediate sequence in-between the two identified groups of dirty data blocks is formed by a combination of one or more dirty data blocks and one or more empty data blocks.

29. The method according to claim 23, wherein said identifying further comprises identifying a plurality of groups of dirty data blocks pairs, each dirty data blocks group is comprised of dirty data blocks which are arranged within the secondary storage entity in a successive sequence, and for each pair of dirty data blocks groups, to further identify a group of backed-up data blocks which are arranged within the secondary storage entity in a successive sequence intermediately in-between the respective pair of, and wherein said combining comprises combining some or all of the identified groups of dirty data blocks and some or all of the identified of backed-up data blocks to form a successive extended sequence within said secondary storage entity.

30. The method according to claim 23, further comprising ranking a destage priority of the extended flush sequence relative to other pending flush sequences according to a size of the extended flush sequence and according to a density of dirty data blocks within the flush sequence.

31. The method according to claim 23, wherein said identifying is implemented one chunk at a time.

32. The method according to claim 31, wherein for each chunk, said identifying includes scanning the primary storage entity for groups of dirty data blocks forming a successive sequence within the current chunk of the secondary storage entity.

33. The method according to claim 31, wherein for each chunk, said scanning include scanning the primary storage entity for at least one group of backed-up data blocks which forms within the current chunk of the secondary storage entity an intermediary successive sequence in-between at least two identified groups of dirty data blocks.

34. The method according to claim 33, wherein said combining includes combining two of the identified groups of dirty data blocks within a current chunk with a group of backed-up data blocks which forms within the secondary storage entity an intermediary successive sequence in-between the two identified groups of dirty data blocks to form a single extended successive flush sequence.

35. The method according to claim 33, wherein said identifying includes identify a plurality of pairs of dirty data blocks groups, each dirty data blocks group is comprised of dirty data blocks which are arranged within a current chunk of the secondary storage entity in a successive sequence, and for each pair of dirty data blocks groups, identifying a group of backed-up data blocks which are arranged within the secondary storage entity in a successive sequence intermediately in-between the respective groups pair, and wherein said combining comprises combining some or all of the identified groups of dirty data blocks and some or all of the identified of backed-up data blocks to form a successive extended flush sequence within the current chunk.

36. The method according to claim 34, further comprising ranking a chunk according to a density of dirty data blocks within a flush sequence formed by blocks within the respective chunk and according to a size of the flush sequence.

37. The method according to claim 36, wherein said ranking a chunk further comprises reading a timestamp corresponding to a most recent destaging of a flush sequence within that chunk, and adapting a rank of the chunk according to the chunk's timestamp.

38. The method according to claim 36, wherein said ranking comprises identifying a largest flush sequence for the current chunk and ranking each chunk according to its largest flush sequence.

39. The method according to claim 23, wherein said identifying comprises implementing a minimal and/or a maximal group size for one or more of the following:
a group of dirty-data blocks which are arranged within the secondary storage entity in a successive sequence;
a group of backed-up data blocks which are arranged within the secondary storage entity in a successive sequence intermediately in-between two identified groups of dirty data blocks;
a group of backed-up and/or empty data blocks which are collectively arranged within the secondary storage entity in a successive sequence intermediately in-between two identified groups of dirty data blocks; and
a group of blocks constituting a flush sequence.

40. The method according to claim 23, wherein said secondary storage entity implements a parity protection scheme, and wherein said identifying comprises identifying one or more parity data blocks which are arranged within the secondary storage entity in a successive sequence in-between the two identified groups of dirty data blocks, and the successive intermediate sequence in-between the two identified groups of dirty data blocks is formed by a combination of the one or more parity blocks and one or more dirty data blocks with or without one or more empty data blocks.

41. The method according to claim 23, wherein during normal operation of the system, the secondary storage tier is dedicated for handling incoming writes only.

42. The method according to claim 23, wherein the primary storage entity is characterized by relatively high performance, in particular in random access, whereas the secondary storage tier is characterized by relatively slower performance at least in random access or when performing relatively small write operations.

43. The method according to claim 23, wherein the primary storage entity is comprised primarily of solid state data-retention units that are utilized for persistently storing the entire data-set of the storage system and the secondary storage entity is comprised primarily of non-solid-state data retention units.

44. The method according to claim 23, wherein the primary storage entity is comprised primarily of volatile data-retention units that are utilized for persistently storing the entire data-set of the storage system and the secondary storage entity is comprised primarily of nonvolatile data retention units.

45. A program storage device readable by machine, tangibly embodying a program of instructions executable by the machine to perform a method of managing a storage system, comprising:
selecting from primary storage entity groups of data blocks to be destaged to a secondary storage entity, the selection comprising:
identifying within a primary storage entity two groups of dirty data blocks, each group is comprised of dirty data blocks which are arranged within a secondary storage entity in a successive sequence; identifying within the primary storage entity a further group of backed-up data blocks which are arranged within the secondary storage entity in a successive sequence intermediately in-between the two identified groups of dirty data blocks; and
combining the group of backed-up data blocks together with the two identified groups of dirty data blocks to form a successive extended flush sequence and to destage it to the secondary storage entity.

46. A computer program product comprising a non-transitory computer useable medium having computer readable program code embodied therein of managing a storage system, the computer program product comprising:
computer readable program code for causing the computer to select from primary storage entity groups of data blocks to be destaged to a secondary storage entity;
the selection comprising identifying within a primary storage entity two groups of dirty data blocks, each group is comprised of dirty data blocks which are arranged within a secondary storage entity in a successive sequence; identifying within the primary storage entity a further group of backed-up data blocks which are arranged within the secondary storage entity in a successive sequence intermediately in-between the two identified groups of dirty data blocks; and
computer readable program code for causing the computer to combine the group of backed-up data blocks together with the two identified groups of dirty data blocks to form a successive extended flush sequence and to destage it to the secondary storage entity.

* * * * *